US008969534B2

(12) United States Patent
Stahl et al.

(10) Patent No.: US 8,969,534 B2
(45) Date of Patent: Mar. 3, 2015

(54) SELECTIVE AEROBIC ALCOHOL OXIDATION METHOD FOR CONVERSION OF LIGNIN INTO SIMPLE AROMATIC COMPOUNDS

(71) Applicant: Wisconsin Alumni Research Foundation, Madison, WI (US)

(72) Inventors: Shannon S. Stahl, Madison, WI (US); Alireza Rahimi, Madison, WI (US)

(73) Assignee: Wisconsin Alumni Research Foundataion, Madison, WI (US)

(*) Notice: Subject to any disclaimer, the term of this patent is extended or adjusted under 35 U.S.C. 154(b) by 0 days.

(21) Appl. No.: 13/771,733

(22) Filed: Feb. 20, 2013

(65) Prior Publication Data
US 2014/0235838 A1    Aug. 21, 2014

(51) Int. Cl.
C07G 1/00       (2011.01)
C08H 7/00       (2011.01)
C08L 97/00      (2006.01)
C07C 45/00      (2006.01)

(52) U.S. Cl.
CPC .................................... *C07G 1/00* (2013.01)
USPC ........................... 530/500; 530/507; 568/320

(58) Field of Classification Search
CPC ................... C07G 1/00; C07C 45/37–45/39
USPC ................................ 530/500, 507; 568/320
See application file for complete search history.

(56) References Cited

U.S. PATENT DOCUMENTS

| | | | | |
|---|---|---|---|---|
| 3,070,591 A * | 12/1962 | Hoyt | | 530/500 |
| 3,671,428 A * | 6/1972 | Kim | | 507/106 |
| 4,052,448 A * | 10/1977 | Schulz et al. | | 562/410 |
| 4,053,645 A * | 10/1977 | Jelks | | 426/53 |
| 4,076,579 A * | 2/1978 | Brink | | 162/53 |
| 4,668,243 A * | 5/1987 | Schulz | | 530/507 |
| 4,790,382 A * | 12/1988 | Morrow et al. | | 166/270.1 |
| 4,847,422 A * | 7/1989 | Klemola et al. | | 568/438 |
| 4,946,946 A * | 8/1990 | Fields et al. | | 530/500 |
| 5,094,295 A * | 3/1992 | Morrow | | 166/270.1 |
| 5,446,133 A * | 8/1995 | Detroit | | 530/500 |
| 6,187,170 B1 * | 2/2001 | Hampp | | 205/688 |
| 6,242,245 B1 * | 6/2001 | Amann et al. | | 435/277 |
| 7,906,687 B2 * | 3/2011 | Voitl et al. | | 568/426 |
| 8,454,799 B2 * | 6/2013 | Jehn-Rendu et al. | | 162/202 |
| 2008/0105393 A1 * | 5/2008 | Besemer et al. | | 162/70 |
| 2010/0121110 A1 * | 5/2010 | Voitl et al. | | 568/426 |
| 2010/0152435 A1 * | 6/2010 | Stapley et al. | | 536/123.12 |

(Continued)

OTHER PUBLICATIONS

Bonini et al. Photochem. Photobiol. Sci. 2002, 1, 570-573.*

(Continued)

*Primary Examiner* — Liam J Heincer
(74) *Attorney, Agent, or Firm* — Joseph T. Leone, Esq.; Daniel A. Blasiole; DeWitt Ross & Stevens S.C.

(57) ABSTRACT

Described is a method to oxidize lignin or lignin sub-units. The method includes oxidation of secondary benzylic alcohol in the lignin or lignin sub-unit to a corresponding ketone in the presence of unprotected primarily aliphatic alcohol in the lignin or lignin sub-unit. The optimal catalyst system consists of $HNO_3$ in combination with another Brønsted acid, in the absence of a metal-containing catalyst, thereby yielding a selectively oxidized lignin or lignin sub-unit. The method may be carried out in the presence or absence of additional reagents including TEMPO and TEMPO derivatives.

21 Claims, 7 Drawing Sheets

(56) References Cited

U.S. PATENT DOCUMENTS

2011/0239973 A1* 10/2011 Qin .............................. 123/1 A
2013/0040031 A1* 2/2013 Stecker et al. ................ 426/538
2013/0078698 A1* 3/2013 Lali et al. ...................... 435/165
2014/0011984 A1* 1/2014 Ralph et al. ................... 530/500

OTHER PUBLICATIONS

Kuang et al. Adv. Synth. Catal. 2010, 352,2635-2642.*
Hornof et al. Journal of Applied Polymer Science, vol. 41, 2392-2398 (1990).*
Aellig et al., Acid-Catalyzed Decomposition of the Benzyl Nitrite Intermediate in $HNO_3$-Mediated Aerobic Oxidation of Benzyl alcohol, ChemCatChem 2012, 4, 525-529.
Badamali et al., Co(salen)/SBA-15 catalysed oxidation of a β-O-4 phenolic dimer under microwave irradiation, Catalysis Communications 2011, 12, 993-995.
Brink et al., Catalytic Conversions in Water. Parts 23: Steric Effects and Increased substrate Scope in the Palladium-Neocuproine Catalyzed Aerobic Oxidation of Alcohols in Aqueous solvents, Adv. Synth. Catal. 2003, 345, 1341-1352.
Buendia et al., Preparation of Diastereomerically Pure Dilignol Model Compounds, Chem. Eur. J. 2011, 17, 13877-13882.
Chheda et al., Liquid-Phase Catalytic Processing of biomass-Derived Oxygenated Hydrocarbons to Fuels and Chemicals, Angew. Chem. Int. Ed. 2007, 46, 7164-7183.
Cho et al., Nature and Kinetic Analysis of Carbon-Carbon Bond Fragmentation Reactions of Cation Radicals Derived from SET-Oxidation of Lignin Model Compounds, J. Org. Chem. 2010, 75, 6549-6562.
Collinson et al., the catalytic oxidation of biomass to new materials focusing on starch, cellulose and lignin, Coord. Chem. Rev. 2010, 254, 1854-1870.
Corma et al., Chemical Routes for the Transformation of Biomass into Chemicals, Chem. Rev. 2007, 107, 2411-2502.
Crestini et al , Immobilized methyltrioxo rhenium (MTO/$H_2O_2$ systems for the oxidation of lignin and lignin model compounds, Biorg. Med. Chem. 2006, 14, 5292-5302.
Cui et al/. Biomimetic degradation of lignin, J. Biotechnol. 1993, 30, 15-26.
Cui et al., Metallophthalocyanines as Possible Lignin Peroxidase Models, . Bioorg. Med. Chem. 1995, 3, 471-477.
Cutulic et al., Metal-Free Reductive Cleavage of C-O σ-bonds in Acyloin Derivatives by an Organic Neutral Super-electron-Donor, J. Org. Chem. 2009, 74, 871-87183.
Gosselink et al., Co-ordination network for lignin-standardisation, production and applications adapted to market requirements (EUROLIGNIN), Ind. Crops Prod. 2004, 20, 121-129.
Grabber, J. H., How Do Lignin Composition, Structure, and Cross-Linking Affect Degradability? A Review of Cell Wall Model Studies, Crop Sci. 2005, 45, 820.
Hanson et al., Aerobic Oxidation of Lignin Models Using a Base Metal Vanadium Catalyst, Inorg. Chem. 2010, 49, 5611-5618.
Hanson et al., C-C or C-O Bond Cleavage in a Phenolic Lignin Model Compound: Selectivity Depends on Vanadium Catalyst, Angew. Chem. Int. Ed. 2012, 51, 3410-3413.
Herrmann et al., Methyltrioxorhenium: oxidative cleavage of CC-double bonds and it application in a highly efficient synthesis of vanillin from biological waster, J. Mol. Catal. A: Chem. 2000, 153, 49-52.
Hocking, M.B., Vanillin: Synthetic Flavoring from Spent Sulfite Liquor, J. Chem. Educ. 1997, 74, 1059.
Hurrell et al., Photochemistry of lignin model compounds on solid supports, Can. J. Chem. 1993, 71, 1340.
Ibrahim et al., Synthesis of *erythro* and *threo* forms of Lignin Models of the Arylglycerol β-Guaiacyl Ether Type, Acta. Chem. Scand. 1994, 48, 149-151.
Jeena et al., Convenient photooxidation of alcohols using dye sensitized zinc oxide in combination with silver nitrate and TEMPO,Chem. Commun. 2012, 48, 299-301.
Kandanarachchi et al., Model Compound Studies of the β-)-4 Linkage in Lignin: Absolute Rate Expressions for β-Scission of Phenoxyl Radical from 1-Phenyl-2-phenoxyethanol-1-yl Radical, J. Org. Chem. 2002, 23, 7937-7945.
Kuang et al., A Nitric Acid-assisted Carbon-Catalyzed Oxidation System with Nitroxide Radical Cocatalysts as an Efficient and Green Protocol for Selective Aerobic Oxidation of Alcohols, Adv. Synth. Catal. 2010, 352, 2635-2642.
Kumar et al., Methods for Pretreatment of Lignocellulosic Biomass for Efficient Hydrolysis and Biofuel Production. Ind. Eng. Chem. Res. 2009, 48, 3713-3729.
Larsson et al., Gaschromatographische Analyse von Ligninocydations-produkten,. Acta. Chem. Scand. 1971, 25, 647-662.
Ma et al., Development of a General and Practical Iron Nitrate/TEMPO-Catalyzed Aerobic Oxidation of Alcohols to Aldehydes/Ketones: Catalysis with Table Salt, Adv. Synth. Catal. 2011, 353, 1005-1017.
Martínz et al., Monolignol acylation and lignin structure in some nonwoody plants: a 2D NMR study, Phytochemistry 2008, 69, 2831-2843.
Naimi-Jamal et al., Sustainable Synthesis of Aldehydes, Ketones or Acids from Neat Alcohols Using Nitrogen Dioxide Gas, and Related Reactions, ChemSusChem 2009, 2, 83-88.
Nichols et al., Catalytic C-O Bond Cleavage of 2-Aryloxy-1 -arylethanols and its Application to the Depolymerization of Lignin-Related Polymers, J. Am. Chem. Soc. 2010, 132, 12554-12555.
Nillar et al., Oxidation of Hardwood Kraft-Lignin to Phenolic Derivatives, Nitrobenzene and Copper Oxide as Oxidants, J. Wood Chem. Technol. 1997, 17, 259-285.
Pardini et al., electroorganic Reactions. 38. Mechanism of Electrooxidative Cleavage of Lignin Model Dimers, J. Org. Chem. 1991, 56, 7305-7513.
Partenheimer, W., The Aerobic Oxidative Cleavage of Lignin to Produce Hydroxy-aromatic Benzaldehydes and Carboxylic Acids via metal/Bromide Catalysts in Acetic Acid/Water Mixtures. Adv. Synth. Catal. 2009, 351, 456.
Pepper et al., Lignin oxidation. Preferential use of cupric oxide, C. Can. J. Chem. 1967, 45, 3009.
Philippidis et al., Study of the Enzymatic Hydrolysis of Cellulose for Production of Fuel Ethanol by the Simultaneous Saccharification and Fermentation Process, Biotechnol. Bioeng. 1993, 41, 846-853.
Ralph, J., Encyclopedia of Life Sciences, Lignins, © 2007 John Wiley & Sons, Ltd.
Sarkanen, K. V.; Ludwig, C. H. Lignins, Occurrence, Formation, Structure and Reactions; Wileylnterscience, New York, 1971.
Sawaki et al., Mechnism of C-C Cleavage of Cyclic 1,2-Diketones with Alkaline Hydrogen Peroxide. The Acyclic Mechanism and its Application to the Basic Autooxidation of Pyrogallol, J. Am. Chem. Soc. 1983, 105, 5035.
Shibuya, et al., Highly Efficient, Organocatalytic Aerobic Alcohol Oxidation, J. Am. Chem. Soc. 2011, 133, 6497-6500.
Son et al., Non-Oxidative Vanadium-Catalyzed C-O Bond Cleavage: application to Degradation to Lignin Model Compounds, Angew. Chem. Int. Ed. 2010, 49, 3791-3794.
Steinhoff et al., Mechanistic Study of Alcohol Oxidation by the $Pd(OAc)_2/O_2$/DMSO Catalyst System and Implications for the Development of Improved Aerobic Oxidation Catalysts,. J. Am. Chem. Soc. 2002, 124, 766.
Steinhoff et al., Mechanism of $Pd(OAc)_2$/DMSO-Catalyzed Aerobic Alcohol Oxidation: mass-Transfer-limitation Effects and Catalyst Decomposition Pathways, J. Am. Chem. Soc. 2006, 128, 4344355.
Strazzolini et al., Oxidation of Benzylic alcohols and Ethers to Carbonyl Derivatives by Nitric Acid in Dichloromethane, J. Org. Chem. 2003, 2003, 526-536.
Tanielyan et al., Transition Metal Free Catalytic Aerobic Oxidation of Methyl-α-D-Glucopyranoside Under Mild Conditions Using Stable Nitroxyl Free Radicals, Top Catal 2012, 55, 556-564.
Tarabanko et al., On the mechanism of Vanillin Formation in the Catalytic Oxidationi of Lignin With Oxygen, React. Kinet. Catal. Lett. 1995, 55, 161-170.
Thomas et al., Systematische Aufzählung von mikroporöosen Festkörpern: auf dem Weg zu Designer-Katalysatoren, Angew. Chem. 2007, 119, 7294-7297.

(56) References Cited

OTHER PUBLICATIONS

U.S. Energy Information Administration/Annual *Energy Review* 2011, Washington, DC 20585, 2012.

Vanholme et al., Lignin Biosynthesis and Structure, *Plant Physiology*, 2010, 153, 895-905.

Wang et al., TEMPO/HCl/NaNo$_2$ Catalyst: A Transition Metal Free Approach to Efficient Aerobic Oxidation of Alcohols to Aldehydes and Ketones Under Mild Conditions, *Chem. Eur. J.* 2008, 14, 2679-2685.

Yamamura et al., Microscale alkaline nitrobenzene oxidation method for high-throughput determination of lignin aromatic components, *Plant Biotech.* 2010, 27, 305-310.

Zakzeski et al., The Catalytic Valorization of Lignin for the Production of Renewable Chemicals, *Chem, Rev.* 2010, 110, 3552-3599.

Zhang et al., Wet Aerobic Oxidation of Lignin into Aromatic Aldehydes Catalysed by a Perovskite-type Oxide: LaFe$_{1-x}$CUxO$_3$ (x=0, 0.1, 0.2), *Molecules* 2009, 14, 2747-2757.

Zhang et al., Aerobic Oxidation Reactions Catalyzed by Vanadium complexes of Bis(Phenolate) Ligands, *Inorg. Chem.* 2012, 51, 7354-7361.

* cited by examiner

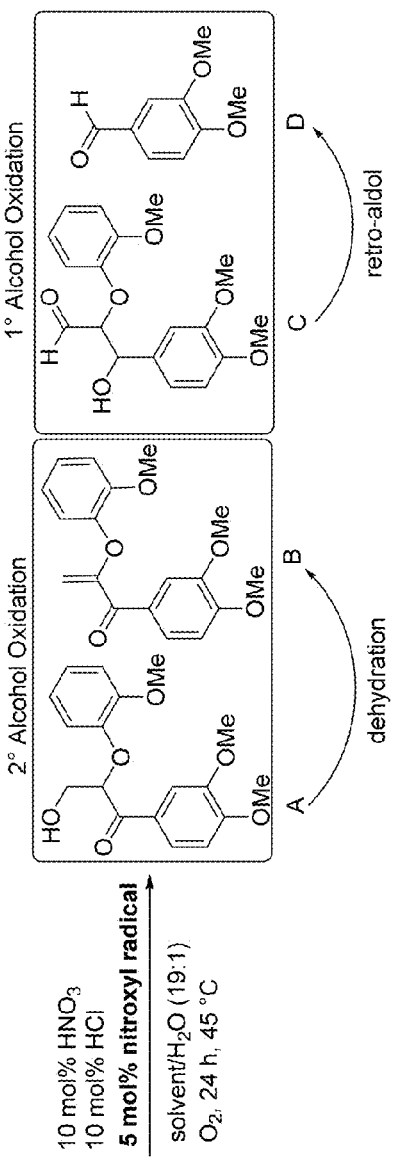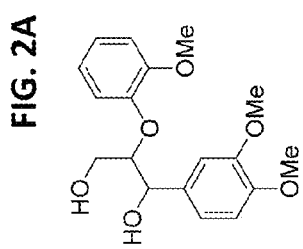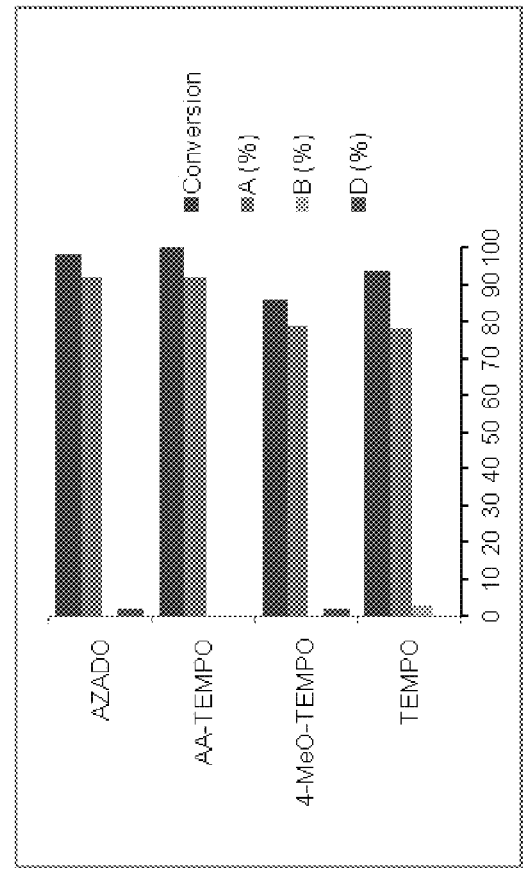
FIG. 2A
FIG. 2B

SELECTIVE AEROBIC ALCOHOL OXIDATION METHOD FOR CONVERSION OF LIGNIN INTO SIMPLE AROMATIC COMPOUNDS

FEDERAL FUNDING STATEMENT

This invention was made with government support under DE-FC02-07ER64494 awarded by the US Department of Energy. The government has certain rights in the invention.

BACKGROUND

Due to the depletion of petroleum-based fuels and chemicals and their detrimental impact on the environment, a transition to renewable fuels and chemicals is garnering considerable attention. ((a) U.S. Energy Information Administration/Annual Energy Review 2011, Washington, D.C. 20585. (b) Corma, A.; Iborra, S.; Velty, A. Chem. Rev. 2007, 107, 2411. (c) Chheda, J. N.; Huber, G. W.; Dumesic, J. A. Angew. Chem. 2007, 119, 7298; Angew. Chem. Int. Ed. 2007, 46, 7164.) Of these renewable sources, lignocellulosic biomass (cellulose, hemicellulose, and lignin) plays a crucial role. Lignin is a major component of non-edible biomass (15-30% by weight; 40% by energy). ((a) Zakzeski, J.; Bruijnincx, P. C. A.; Jongerius, A. L.; Wechhuysen, B. M. Chem, Rev. 2010, 110, 3552. (b) Ralph, J., Encyclopedia of Life Sciences, Lignins, © 2007 John Wiley & Sons, Ltd.)

Lignin is also a cheap byproduct in the production of pulp and biofuel. It is one of the few naturally occurring sources of high-volume aromatics and therefore represents a potentially valuable feedstock for the production of organic chemicals. ((a) Collinson, S. R.; Thielemans, W. Coord. Chem. Rev. 2010, 254, 1854. (b) Grabber, J. H. Crop Sci. 2005, 45, 820.) While conversion of cellulose and hemicellulose into pulp and ultimately fuel has been extensively studied ((a) Philippidis, G. P.; Smith, T. K.; Wyman, C. E. Biotechnol. Bioeng. 1993, 41, 846. (b) Kumar, P.; Barrett, D. M.; Delwiche, M. J.; Stroeve, P. Ind. Eng. Chem. Res. 2009, 48, 3713), lignin is generally regarded as a byproduct. It is most typically burned to harness its thermal energy in any number of processes. (Gosselink, R. J. A.; Jong, E. de; Guran, B.; Abaecherli, A. Ind. Crops Prod. 2004, 20, 121.)

Beyond simple combustion, there are two basic approaches to lignin utilization in common use today. (Sarkanen, K. V.; Ludwig, C. H. Lignins, Occurrence, Formation, Structure and Reactions; WileyInterscience, New York, 1971.) The first approach is to exploit the properties of this natural polymer in carbon fibers, adhesives, concrete products, oil well drilling muds, as partial phenol replacements in phenol-formaldehyde resins, and in electronic circuit boards. The second approach is to convert the lignin polymer into simple low-molecular-weight organic chemicals. Processes for oxidation of lignin and associated model compounds have been the focus of extensive investigation. ((a) Cui, F.; Wijesekara, T.; Dolphin, D. J. Biotechnol. 1993, 30, 15. (b) Cui, F.; Dolphin, D. Bioorg. Med. Chem. 1995, 3, 471. (c) Herrmann, W. A.; Weskamp, T.; Zoller, J. P.; Fischer, R. W. J. Mol. Catal. A: Chem. 2000, 153, 49. (d) Crestini, C.; Caponi, M. C.; Argyropoulos, D. S.; Saladino, R. Biorg. Med. Chem. 2006, 14, 5292. (e) Partenheimer, W. Adv. Synth. Catal. 2009, 351, 456. (f) Zhang, J.; Deng, H.; Lin, L. Molecules 2009, 14, 2747.)

For instance, the world's supply of artificial vanillin is commercially produced by oxidation of lignosulfonate from spent sulfite liquor from essentially a single mill. (Hocking, M. B.; J. Chem. Educ. 1997, 74, 1059.) The process is via fairly simple oxidation, using molecular oxygen or stoichiometric CuO in aqueous basic solution. ((a) Larsson, S.; Miksche, G. E. Acta. Chem. Scand. 1971, 25, 647. (b) Pepper, J. M. Casselma, B. W.; Karapall, J. C. Can. J. Chem. 1967, 45, 3009.) The process, however, uses a lignosulfonate feedstock that arises from the expensive and more polluting sulfite pulping process, which is used in very few mills today. Also, oxidation of lignin with stoichiometric nitrobenzene in 1M NaOH at 170° C. to produce vanillin and syringaldehyde (up to ~20%) is known. ((a)Yamamura, M.; Hattori, T.; Suzuki, D. S. Plant Biotech. 2010, 27, 305.(b) Nillar, J. C.; Caperos, A.; GarciaOchoa, F. J. Wood Chem. Technol. 1997, 17, 259.)) (See Scheme 1 for the structure of vanillin and syringaldehyde). This process, however, is not suitable for industrial use because of its high energy. (The reaction can be explosive, even at laboratory scale.)

Scheme 1. Simple aromatic chemicals derived from lignin oxidation.

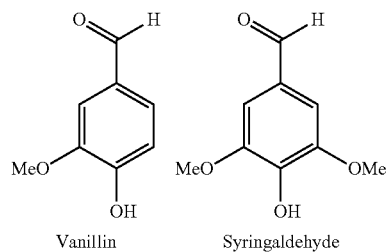

All of these methods suffer from environmental concerns, safety concerns and lack of structural specificity when starting from raw lignin. Therefore, identifying new chemical transformations of lignin that can proceed with high efficiency and selectivity is a long-felt and unmet need.

Lignin is a highly complex biopolymer having a variable structure. The variability of lignin's structure depends, at least in part, on its origin. The most common structural feature in all lignins is a β-O-4 linkage between aromatic rings (>85%; see Scheme 2). ((a) Ibrahim, W.; Lundquist, K. Acta. Chem. Scand. 1994, 48, 149. (b) Martínz, Á. T.; Rencoret, J.; Marques, G.; Gutiérrez, A.; Ibarra, D.; Jiménez-Barbero, J.; del Río, J. C. Phytochemistry 2008, 69, 2831. (c) Vanholme, R.; Demedts, B.; Morreel, K.; Ralph, J.; Boerjan, W. Plant Physiology, 2010, 153, 895.) Another structure feature of lignin is aromatic rings containing secondary benzylic alcohol substituents and primary aliphatic alcohol substituents. Simple model compounds, such as 1, have been used to simulate the chemical reactivity expected from authentic samples of lignin.

Scheme 2. Representative structure of lignin and the corresponding β-O-4 linked model compound 1.

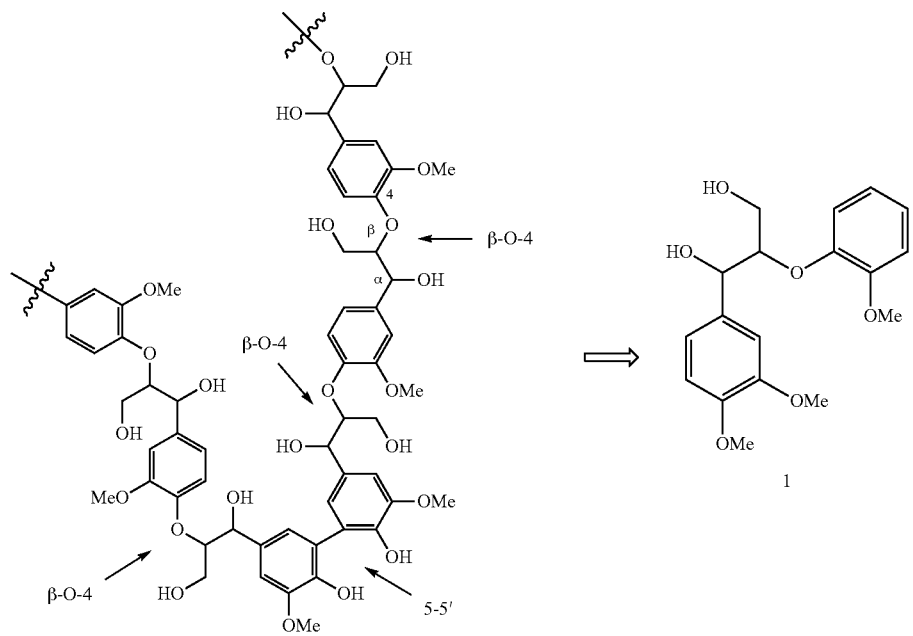

With the recognition that O₂ is the most desirable oxidant for large-scale applications, recent studies have begun to make progress in the development of catalytic aerobic oxidation of more realistic lignin model compounds, such as 1. For example, some research groups have identified several vanadium complexes that show promising aerobic reactivity, in several cases promoting multistep reactions that directly afford C—C/C—O cleavage products. ((a) Son, S.; Toste, D. *Angew. Chem. Int. Ed.* 2010, 49, 3791. (b) Hanson, S. K.; Baker, R. T.; Gordon, J. C.; Scott, B. L.; Thorn, D. L. *Inorg. Chem.* 2010, 49, 5611. (c) Hanson, S. K.; Wu, R.; Silks, L. A. *Angew. Chem. Int. Ed.* 2012, 51, 3410. (d) Zhang, G.; Scott, B. L.; Wu, R.; Silks, L. A.; Hanson, S. A. *Inorg. Chem.* 2012, 51, 7354.)

In addition, a variety of oxidation methods on β-O-4 model compounds have been reported. However, these methods employ harsh reaction conditions, and afford products in low selectivity and yield.

SUMMARY OF THE INVENTION

Disclosed is a method to oxidize lignin or lignin sub-units. The method comprises selectively oxidizing at least a portion of secondary benzylic alcohol groups in the lignin or lignin sub-unit to corresponding ketones while leaving unchanged at least a portion of unprotected primary aliphatic alcohols in the lignin or lignin sub-unit by contacting the lignin or lignin sub-unit with a catalyst comprising nitric acid ($HNO_3$) in combination with another Brønsted acid, in the absence of a metal-containing catalyst, thereby yielding a selectively oxidized lignin or lignin sub-unit.

The method may be carried out in any suitable solvent. Polar aprotic solvent are preferred. The preferred solvent is a nitrile, most preferably acetonitrile. The solvent may also contain up to 20 wt % water, preferably from about 2 wt % to about 15 wt % water, and more preferably from about 2 to about 10 wt % water.

In the preferred version of the method, the catalyst comprises $HNO_3$ in combination with a Brønsted acid selected from the group consisting of hydrochloric acid (HCl), hydrobromic acid (HBr), hydrofluoric acid (HF), hydroiodic acid (HI), phosphoric acid ($H_3PO_4$), sulfuric acid ($H_2SO_4$), boric acid ($B(OH)_3$), tetrafluoroboric acid ($HBF_4$), perchloric acid ($HClO_4$), acetic acid ($CH_3C(O)$—OH), trifluoroacetic acid ($CF_3C(O)$—OH), methanesulfonic acid ($CH_3SO_3H$), solid acid resins containing sulfonic acid sites, and solid acid resins containing benzoic acid sites. The preferred combination comprises, consists essentially of, or consists of $HNO_3$ and HCl. It is generally preferred, although not required, that the $HNO_3$ and the Brønsted acid are each present in a concentration of from about 2 mol % to about 20 mol %.

The selective oxidation may be conducted in contact with atmospheric air or the selective oxidation may conducted in an environment comprising an $O_2$ partial pressure of at least about 1 atm.

The selective oxidation reaction disclosed herein may be conducted at a temperature of from about 10° C. to about 100° C., or from about 20° C. to about 80° C., or from about 25° C. to about 50° C.

The selective oxidation reaction disclosed herein may be conducted in the absence of a nitroxyl radical. Alternatively, the selective oxidation reaction disclosed herein may be conducted in the presence of a reagent comprising a nitroxyl radical. If a nitroxyl radical is present, it is preferred, but not required, that it is selected from the group consisting of TEMPO, NHAc-TEMPO, 4-$C_{1-6}$-alkyloxy-TEMPO, 4-hydroxy-TEMPO, diphenylnitroxyl, di-tert-butylnitroxyl, 9-azabicyclo[3.3.1]nonane N-oxyl (ABNO), and AZADO. The nitroxyl radical may be present in a concentration of from about 2 mol % to about 10 mol %.

In one specific version of the process, the reaction comprises contacting the lignin or lignin sub-unit with a catalyst comprising $HNO_3$ and HCl, in a solvent system comprising acetonitrile and water, and the reaction is conducted in the presence of a reagent selected from the group consisting of TEMPO, NHAc-TEMPO, 4-$C_{1-6}$-alkyloxy-TEMPO, 4-hydroxy-TEMPO, diphenylnitroxyl, di-tert-butylnitroxyl, 9-azabicyclo[3.3.1]nonane N-oxyl (ABNO), and AZADO. In this specific version of the process, the $HNO_3$ and HCl may present in a concentration of from about 5 mol % to about 15 mol %. Concentrations above and below these levels are within the scope of the claims. The selective oxidation reaction may be conducted in contact with atmospheric air, or in an environment comprising an $O_2$ partial pressure of at least about 1 atm. The preferred temperature ranges are as stated previously.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in organic chemistry.

BRIEF DESCRIPTION OF THE DRAWINGS

FIG. 2A is a reaction scheme depicting using a nitroxyl radical for aerobic oxidation of compound 1 with $HNO_3$/HCl.

FIG. 2B is a histogram depicting the yield and conversion of the reaction shown in FIG. 5A.

DETAILED DESCRIPTION

Figure 1:
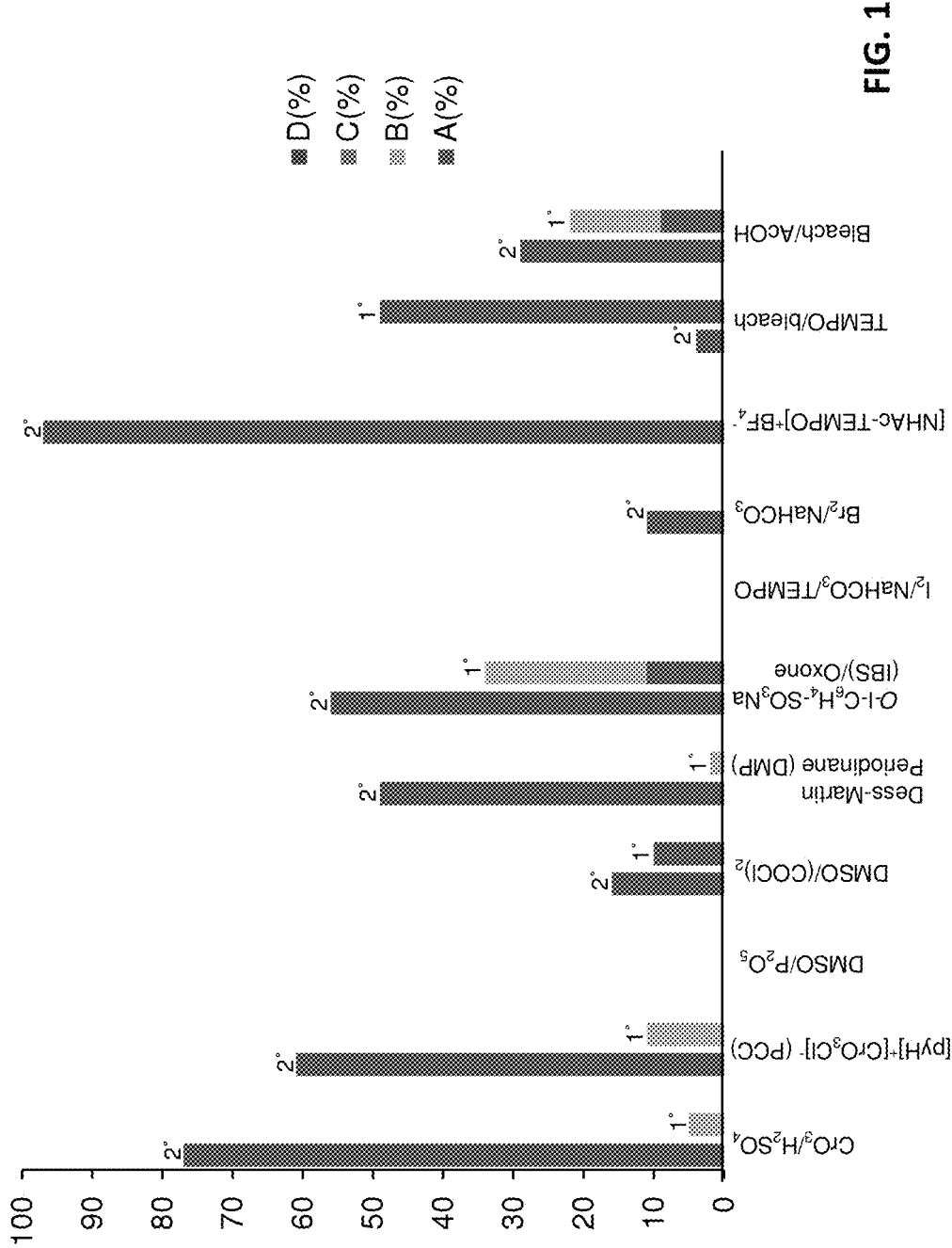
FIG. 1 is a histogram depicting products derived from oxidation of primary and secondary alcohols in lignin model compounds.

Abbreviations and Definitions
NHAc-TEMPO=AA-TEMPO=4-Acetamido-(2,2,6,6-tetramethylpiperidin-1-yl)oxyl:

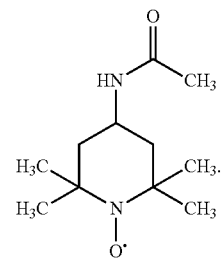

(CAS Number 14691-89-5. Commercially available from Sigma-Aldrich, St. Louis, Mo., USA; catalog no. 390380).

AZADO=2-Azaadamantane-N-oxyl (CAS No. 57625-08-8; Sigma-Aldrich catalog no. 701718):

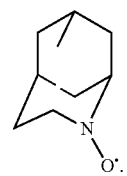

Brønsted acid, Brønsted base: As used herein, a Brønsted acid is a molecule or ion that is able to lose, or "donate," a hydrogen cation (proton, $H^+$). A Brønsted base is a molecule or ion with the ability to gain, or "accept," a hydrogen cation. The term "Brønsted acid" explicitly includes, but is not limited to, hydrochloric acid (HCl), hydrofluoric acid (HF), hydrobromic acid (HBr), hydroiodic acid (HI), phosphoric acid ($H_3PO_4$), sulfuric acid ($H_2SO_4$), boric acid ($B(OH)_3$), tetrafluoroboric acid ($HBF_4$), perchloric acid ($HClO_4$), acetic acid ($CH_3C(O)$—OH), trifluoroacetic acid ($CF_3C(O)$—OH), methanesulfonic acid ($CH_3SO_3H$), solid acid resins containing sulfonic acid sites, and solid acid resins containing benzoic acid sites bpy=2,2'-bipyridine (CAS No. 366-18-7; Sigma-Aldrich catalog no. 14453):

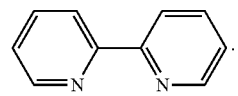 [SMILES: c1ccc(-c2ccccn2)nc1]

2,9-dimethyl-1,10-phenanthroline (also known as neocuproine; CAS No. 484-11-7; Sigma-Aldrich catalog no. N1501):

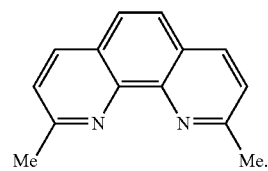 [SMILES: Cc1ccc2ccc3ccc(C)nc3c2n1]

DCE=dichloroethane.

DMSO=dimethylsulfoxide.

HRMS (EI)=high-resolution mass spectrometry—electrospray ionization.

MeCN=acetonitrile.

Nitroxyl radical=A molecule of formula R—NO.. Nitroxyl radicals include, but are not limited to, TEMPO, NHAc-TEMPO, 4-$C_{1-6}$-alkyloxy-TEMPO, 4-hydroxy-TEMPO, diphenylnitroxyl, di-tert-butylnitroxyl, 9-azabicyclo[3.3.1]nonane N-oxyl (ABNO), and AZADO.

NMI=N-methylimidazole (synonymous with 1-methylimidazole; CAS No. 616-47-7; Sigma-Aldrich catalog no. M50834):

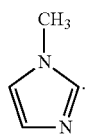

Polar aprotic solvent: As used herein, the term "polar aprotic solvent" explicitly includes, but is not limited to tetrahydrofuran (THF), ethyl acetate (EtOAc), acetone, dimethylformamide (DMF), hexamethylphosphoramide (HMPA), acetonitrile (MeCN), and dimethyl sulfoxide (DMSO).

TEMPO=(2,2,6,6-Tetramethylpiperidin-1-yl)oxyl (CAS Number 2564-83-Sigma-Aldrich catalog no. 2214000):

as a secondary benzylic alcohol group. The oxidation of 1 with both traditional chemical oxidants and metal-catalyzed aerobic oxidations methods was investigated to obtain a range of oxidation products and also to establish the intrinsic reactivity patterns of the lignin-like model compound under a variety of oxidizing conditions.

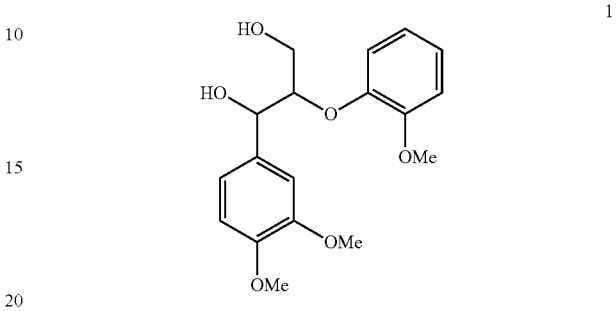

In the present process, the proposed reaction strategies for selectively deconstructing lignin are depicted in Scheme 3. As shown in Scheme. 3, pathway I depicts the products expected if the primary alcohol group is selectively oxidized to the corresponding aldehyde.

Scheme 3. Chemoselective alcohol oxidation strategies for lignin/lignin model compounds.

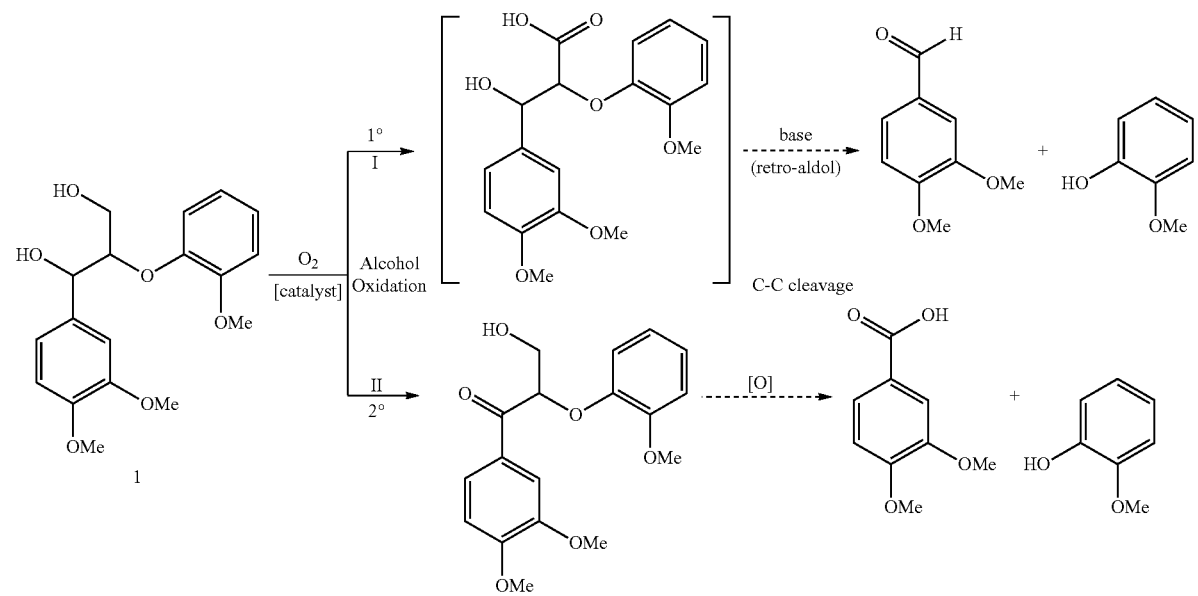

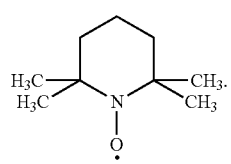

General Approach:

Model compound 1 includes two different types of hydroxyl functional groups: a primary alcohol group, as well as a secondary benzylic alcohol group. Selective cleavage of the aliphatic carbon-carbon bond linking the two aromatic moieties in the oxidized intermediates yields the products shown on the right of Scheme 3.

Pathway II depicts the products expected if the secondary benzylic alcohol group is selectively oxidized to the corresponding ketone. Selective cleavage of the aliphatic carbon-carbon bond linking the two aromatic moieties in the oxidized intermediates yields the products shown on the right of Scheme 3.

In the present work, the reaction of model compound 1 with a various traditional oxidants was investigated in an attempt to selectively oxidize the secondary benzylic alcohol group. The possible reactions are depicted in Scheme 4. The various possible products are designated alphabetically as compounds A, B, C, and D. Results of the experiments are depicted in FIG. 1. Good-to-excellent yields and selectivities for oxidation of the secondary benzylic alcohol were observed with Cr$^{VI}$-oxide, Dess-Martin periodinane and TEMPO-oxoammonium reagents. Veratryl aldehyde (D), observed as a minor product in several of these reactions, is believed to arise from oxidation of the primary alcohol followed by retro-aldol addition. (Tarabanko, V. E.; Fomova, N. A.; Kuznetsov, B. N.; Ivanchenko, N. M.; Kudryashev, A. V. *React. Kinet. Catal. Lett.* 1995, 55, 161.) Activated DMSO methods (e.g., Swern; FIG. 1, entry 3) and stoichiometric TEMPO in AcOH exhibited poor selectivity, affording products derived from both primary and secondary alcohol oxidation. Bleach in combination with catalytic TEMPO (2 mol %) at pH 9 was the only reagent to exhibit good selectivity for primary alcohol oxidation.

Scheme 4. Chemoselective oxidation of primary and secondary alcohol groups in model compound 1.

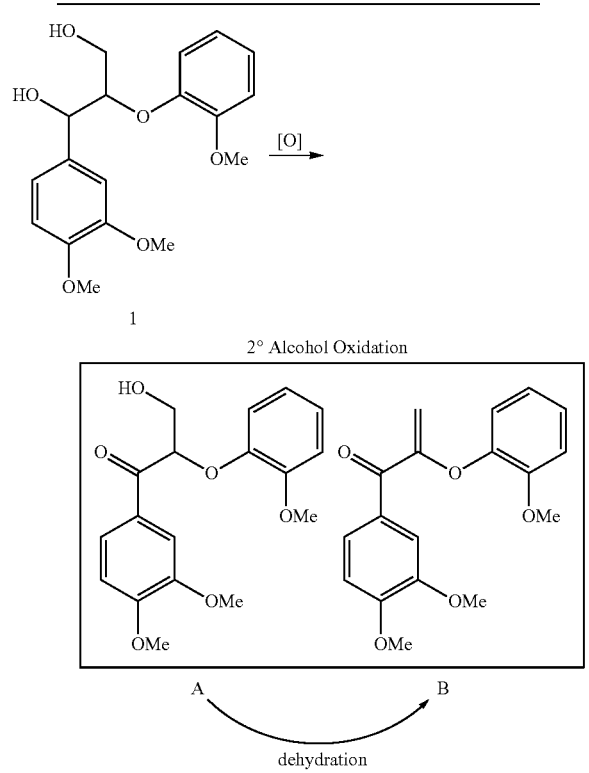

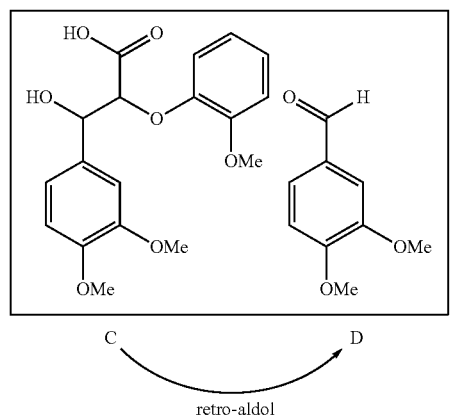

These results established useful benchmarks for developing analogous metal-catalyzed oxidation methods that use O$_2$ as the stoichiometric oxidant. A number of reported aerobic alcohol oxidation catalyst systems were then tested. The conventional methods afford low conversion and/or low selectivity in the oxidation of the dimeric model compound 1 (See Table 1). As shown in Table 1, the catalytic oxidation of model compounds 1 with Cu(I) and Cu(II) salts with TEMPO derivatives (Table 1, entries 1-8) in acetonitrile resulted in the formation of products derived from both secondary benzylic alcohol oxidation and primary aliphatic alcohol oxidation. Attempts to perform the aerobic oxidation of 1 with Pd(OAc)$_2$ in DMSO (Table 1, entry 9) led to 44% conversion and high selectivity (42% of compound A as the only product) in 15 h. ((a) Steinhoff, B. A.; Fix, S. R.; Stahl, S. S. *J. Am. Chem. Soc.* 2002, 124, 766. (b) Steinhoff, B. A.; Stahl, S. S. *J. Am. Chem. Soc.* 2006, 128, 4348.) Conducting the reaction in a mixture of DMSO and water (Table 1, entry 10) and also utilizing 2,9-dimethyl-1,10-phenanthroline as a ligand for Pd(OAc)$_2$, gave 87% conversion with high selectivity (56% of compound A as the only product). (Brink, G. J.; Arends, I. W. C. E.; Hoogenraad, M.; Verspui, G.; Sheldon, R. A. *Adv. Synth. Catal.* 2003, 345, 1341.) Moreover, a full conversion of this substrate has been achieved with good selectivity (approx. 40:1; 79% yield of compound

TABLE 1

Products derived from metal-catalyzed aerobic oxidation of model compound 1.

| entry[a] | metal salts (mol %) | ligand (mol %) | additives 1 | additives 2 | additives 3 | solvent | time (h) | conversion (%)[b] | Yield (%)[b] A | B | C | D | E |
|---|---|---|---|---|---|---|---|---|---|---|---|---|---|
| 1 | Cu(OTf)(MeCN)$_4$ (10) | bpy (10) | TEMPO (10 mol %) | — | — | MeCN | 24 | 77 | 9 | 0 | 2 | 25 | 13 |
| 2 | Cu(OTf)(MeCN)$_4$ (10) | bpy (10) | TEMPO (10 mol %) | NMI (20 mol %) | — | MeCN | 24 | 56 | 0 | 0 | 1 | 30 | 9 |
| 3 | CuBr (10) | bpy (10) | 4-OMe-TEMPO (10 mol %) | — | — | MeCN | 24 | 78 | 2 | 26 | 2 | 30 | 13 |
| 4 | CuBr (10) | bpy (10) | TEMPO (10 mol %) | DABCO (10 mol %) | — | MeCN | 24 | 86 | 6 | 23 | 3 | 31 | 11 |

TABLE 1-continued

Products derived from metal-catalyzed aerobic oxidation of model compound 1.

| entry[a] | metal salts (mol %) | ligand (mol %) | additives 1 | additives 2 | additives 3 | solvent | time (h) | conversion (%)[b] | Yield (%)[b] A | B | C | D | E |
|---|---|---|---|---|---|---|---|---|---|---|---|---|---|
| 5 | CuBr (10) | bpy (10) | TEMPO (10 mol %) | — | — | MeCN | 24 | 89 | 10 | 0 | 0 | 37 | 14 |
| 6 | CuI (10) | bpy (10) | — | — | — | MeCN | 20 | 32 | 23 | 0 | 0 | 3 | 0 |
| 7 | Cu(OTf)$_2$ (5) | 4,4'-tBu$_2$-bpy (5) | TEMPO (5 mol %) | DABCO (5 mol %) | NMI (5 mol %) | MeCN | 24 | 70 | 0 | 21 | 2 | 22 | 0 |
| 8 | Cu(TFA)$_2$ (5) | 4,4'-tBu$_2$-bpy (5) | TEMPO (5 mol %) | DABCO (5 mol %) | NMI (5 mol %) | MeCN | 24 | 71 | 1 | 21 | 3 | 24 | 3 |
| 9 | Pd(OAc)$_2$ (5) | — | — | — | — | DMSO | 15 | 44 | 42 | 0 | 0 | 0 | 0 |
| 10 | Pd(OAc)$_2$ (5) | 2,9-dimethyl-1,10-phenantroline (10) | — | — | — | DMSO:H$_2$O (40:60) | 15 | 87 | 56 | 0 | 0 | 0 | 0 |
| 11 | Fe(NO$_3$)$_3$ (5) | — | TEMPO (10 mol %) | NaCl (10 mol %) | — | DCE | 20 | 100 | 79 | 0 | 0 | 2 | 0 |
| 12 | Fe(NO$_3$)$_3$ (10) | salen (10) | — | — | — | MeCN | 20 | 0 | 0 | 0 | 0 | 0 | 0 |
| 13 | Fe(acac)$_3$ (10) | Phen (10) | K$_2$CO$_3$ (1 equiv) | NaOH (0.5 quiv) | — | toluene | 20 | 43 | 19 | 0 | 0 | 8 | 0 |
| 14 | RuCl$_2$(PPh$_3$)$_3$ (4) | — | TEMPO (12 mol %) | — | — | Cl—C$_6$H$_5$ | 20 | 30 | 17 | 0 | 3 | 5 | 0 |

[a] All reactions run at 60° C. and 1 atm O$_2$ in 1.1 mL of solvent.
[b] Conversion and yields determined by $^1$H NMR spectroscopy versus mesitylene as internal standard and relaxation time 25 ms.

A) favoring secondary benzylic alcohol oxidation using iron (III)nitrate, TEMPO and NaCl in 1,2-dichloroethane (Ma, S.; Liu, J.; Li, S.; Chen, B.; Cheng, J. Kuang, J.; Liu, Y.; Wan, B.; Wang, Y.; Ye, J.; Yu, Q.; Yuan, W.; Yu, S. Adv. Synth. Catal. 2011, 353, 1005.) (Table 1, entry 11).

Non-Metallic Aerobic Oxidation:

The effectiveness of TEMPO-based reagents and co-catalysts in the aerobic oxidation of 1 prompted a consideration of other nitroxyl-catalyzed oxidation methods. Recently, several groups have described metal-free aerobic alcohol oxidation reactions that employ a catalytic nitroxyl species in combination with an inorganic nitrogen oxide co-catalyst. The latter species is proposed to mediate regeneration of an oxoammonium species by O$_2$. ((a) Strazzolini, P.; Runcio, A. Eur. J. Org. Chem. 2003, 2003, 526. (b) Wang, X.; Liu, R.; Jin, Y.; Liang, X. Chem. Eur. J. 2008, 14, 2679. (c) Naimi-Jamal, M. R.; Hamzeali, H.; Mokhtari, J.; Boy, J.; Kaupp, G. ChemSusChem 2009, 2, 83. (d) Kuang, Y.; Rokubuichi, H.; Nabae, Y.; Hayakawa, T.; Kakimoto, M.-a Adv. Synth. Catal. 2010, 352, 2635. (e) Shibuya, M.; Osada, Y.; Sasano, Y.; Tomizawa, M.; Iwabuchi, Y. J. Am. Chem. Soc. 2011, 133, 6497. (f) Aellig, C.; Neuenschwander, U.; Hermans, I. ChemCatChem 2012, 4, 525. (g) Tanielyan, S. K.; Augustine, R. L.; Marin, N.; Alvez, G.; Stapley, J. Top Catal 2012, 55, 556.) A variety of TEMPO and related nitroxyl derivatives were tested as catalysts, with nitric acid or sodium nitrite as the cocatalyst. These conditions proved to be quite effective. The results are shown in Table 2. Highly selective oxidation of 1 to A was observed, with up to 95% isolated yield of A (Table 2, entry 14). The full reaction conditions associated with entry 14 featured 5 mol % AcNH-TEMPO in combination with 10 mol % HNO$_3$ and 10 mol % HCl as co-catalysts in a mixture of CH$_3$CN:H$_2$O (19:1) as the solvent (1 atm O$_2$, 45° C., 24 h).

TABLE 2

Products derived from metal-free aerobic oxidation of model compound 1 by nitroxyl radicals.

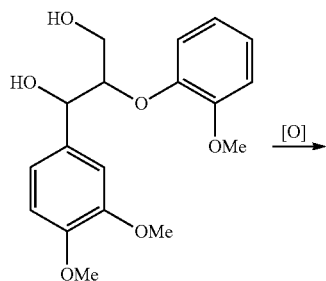

TABLE 2-continued

Products derived from metal-free aerobic oxidation of model compound 1 by nitroxyl radicals.

2° Alcohol Oxidation: A → B (dehydration)
1° Alcohol Oxidation: C → D (retro-aldol)

| entry[a] | N-nitroxyl radical (mol %) | additives (mol %) 1 | additives (mol %) 2 | oxidant | solvent | T (°C.) | time (h) | conversion (%)[a] | Yield (%)[b] A | B | C | D |
|---|---|---|---|---|---|---|---|---|---|---|---|---|
| 1 | TEMPO (4) | NaNO$_2$ (6.5) | HCl (13) | 1 atm O$_2$ | MeCN | 60 | 16 | 66 | 64 | 0 | 0 | 0 |
| 2 | NHAc-TEMPO (3.3) | NaNO$_3$ (3.3) | — | 1 atm O$_2$ | AcOH:H$_2$O (20:1) | 80 | 16 | >85 | — | — | — | — |
| 3 | NHAc-TEMPO (3.3) | HNO$_3$ (2) | — | 1 atm O$_2$ | AcOH:H$_2$O (20:1) | 80 | 16 | >85 | — | — | — | — |
| 4 | TEMPO (5) | HNO$_3$ (20) | — | air | AcOH:H$_2$O (20:1) | rt | 24 | 41 | 31 | 0 | 0 | 2 |
| 5 | NHAc-TEMPO (6.6) | HNO$_3$ (30) | — | air | AcOH:H$_2$O (20:1) | rt | 24 | 50 | 42 | 0 | 5 | 1 |
| 6 | NHAc-TEMPO (6.6) | NaNO$_2$ (100) | HNO$_3$ (10) | air | AcOH:H$_2$O (20:1) | rt | 12 | 46 | 24 | 10 | 6 | 1 |
| 7 | NHAc-TEMPO (5) | NaNO$_3$ (10) | HCl (10) | air | MeCN:H$_2$O (19:1) | rt | 24 | 9 | 8 | 0 | 0 | 0 |
| 8 | 4-OMe-TEMPO (5) | HNO$_3$ (10) | HCl (10) | 1 atm O$_2$ | MeCN:H$_2$O (19:1) | 45 | 24 | 86 | 79 | 0 | 0 | 2 |
| 9 | NHAc-TEMPO (5) | HNO$_3$ (10) | HCl (10) | 1 atm O$_2$ | AcOH:H$_2$O (19:1) | 45 | 24 | 54 | 30 | 4 | 0 | 2 |
| 10 | NHAc-TEMPO (5) | HNO$_3$ (10) | HCl (10) | 1 atm O$_2$ | EtOAc:H$_2$O (19:1) | 45 | 24 | 44 | 13 | 2 | 0 | 3 |
| 11 | NHAc-TEMPO (5) | HNO$_3$ (10) | HCl (10) | air | MeCN:H$_2$O (19:1) | rt | 24 | 74 | 68 | 0 | 0 | 0 |
| 12 | NHAc-TEMPO (5) | HNO$_3$ (10) | HBr (10) | air | MeCN:H$_2$O (19:1) | rt | 24 | 91 | 72 | 11 | 0 | 4 |
| 13 | NHAc-TEMPO (5) | HNO$_3$ (10) | HCl (10) | 1 atm O$_2$ | MeCN | 45 | 24 | 89 | 83 | 0 | 0 | 0 |
| 14 | NHAc-TEMPO (5) | HNO$_3$ (10) | HCl (10) | 1 atm O$_2$ | MeCN:H$_2$O (19:1) | 45 | 20 | 100 | 95 | 0 | 0 | 0 |
| 15 | AZADO (5) | HNO$_3$ (10) | HCl (10) | 1 atm O$_2$ | MeCN:H$_2$O (19:1) | 45 | 20 | 98 | 92 | 0 | 0 | 2 |

[a]All reactions run in 1 mL solvent.
[b]Conversion and yields determined by $^1$H NMR spectroscopy versus mesitylene as internal standard and relaxation time 25 ms.

Performing the aerobic oxidation of 1 in the presence of HBr under mild conditions (Table 2, entry 12) led to high percent conversion (91%), but slightly decreased selectivity in the product mixture (72% product A, 11% B and 4% D). The selected data in Table 2 show that good results were obtained with a number of nitroxyl-based catalysts, but the best results were obtained with 4-acetamido-TEMPO (AcNH-TEMPO) (See FIGS. 2A and 2B).

Figure 3:
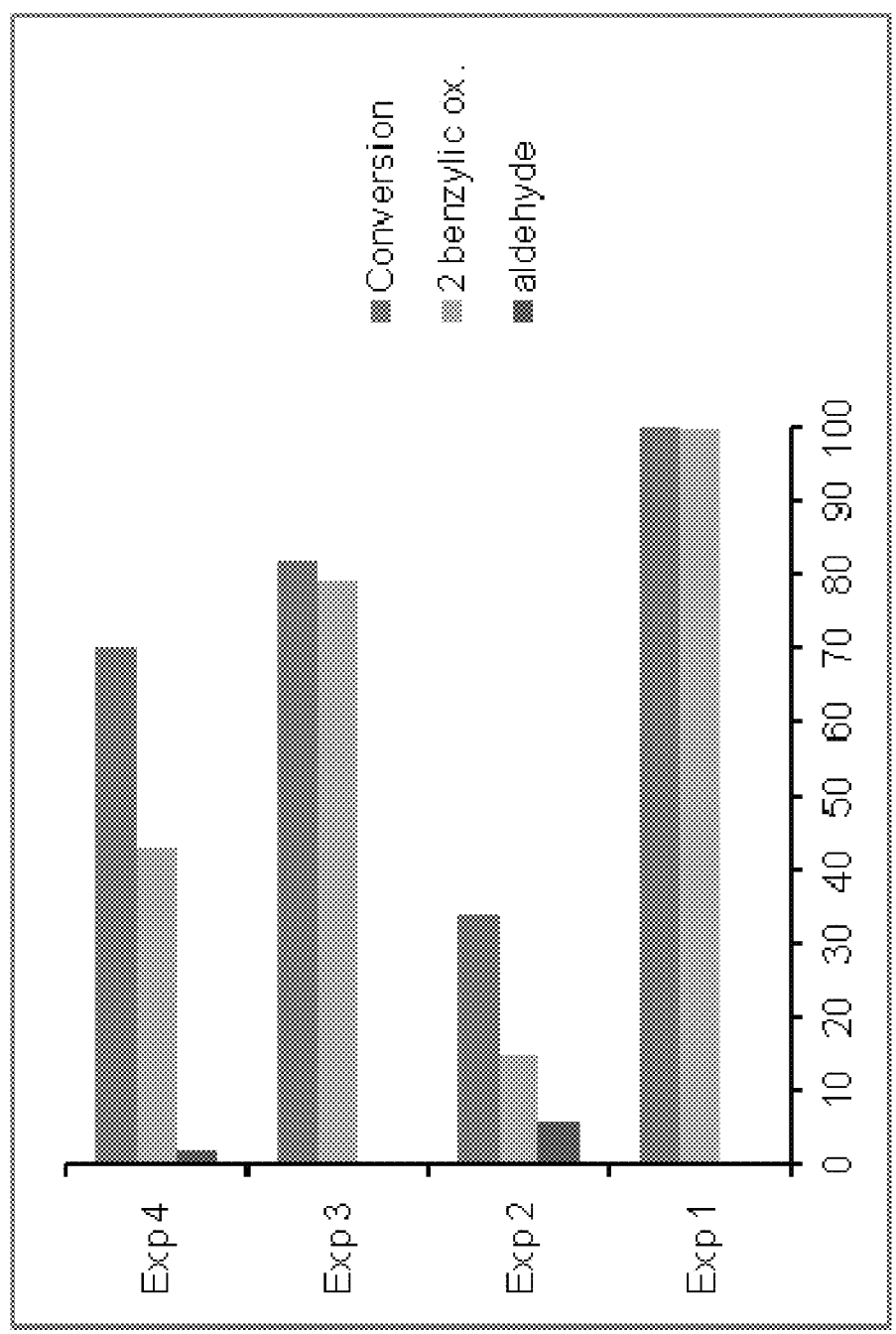
FIG. 3 is a histogram depicting yield and conversion of a metal-free, nitroxyl-free aerobic oxidation of compound 1 using $HNO_3$/HCl.

FIG. 2A depicts the reaction conditions. FIG. 2B depicts that results when utilizing different nitroxyl radicals for the aerobic oxidation of 1 with HNO$_3$/HCl. Four nixtroxyl radicals were used: AZADO, AA-TEMPO, 4-MeO-TEMPO, and TEMPO. Notably, conducting the reaction with HNO$_3$ and HCl in the absence of NHAc-TEMPO resulted in the formation of the desired product in excellent conversion and yield (See FIG. 3). FIG. 3 depicts the results of the nitroxyl-free, aerobic oxidation of 1 with HNO$_3$/HCl. In this nitroxyl-free system, inorganic nitrogen oxide plays a key role for alcohol oxidation. Keeping the nitrogen oxide gas in the reaction media requires close attention to the course of the reaction. The aerobic oxidation will lag if a substantial amount of the gas is allowed to evolve before the reaction is complete.

Using the optimized reaction conditions enables the aerobic oxidation of a variety of lignin model compounds which have been previously studied (Scheme 5).

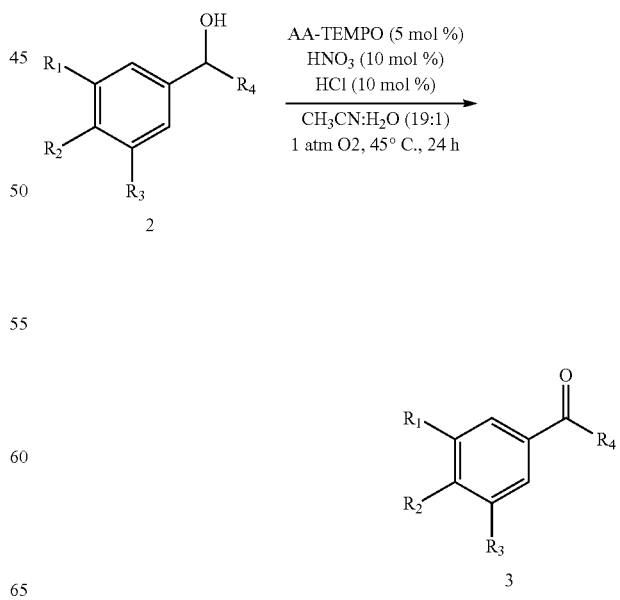

Scheme 5. Metal-free aerobic oxidation of lignin model compounds

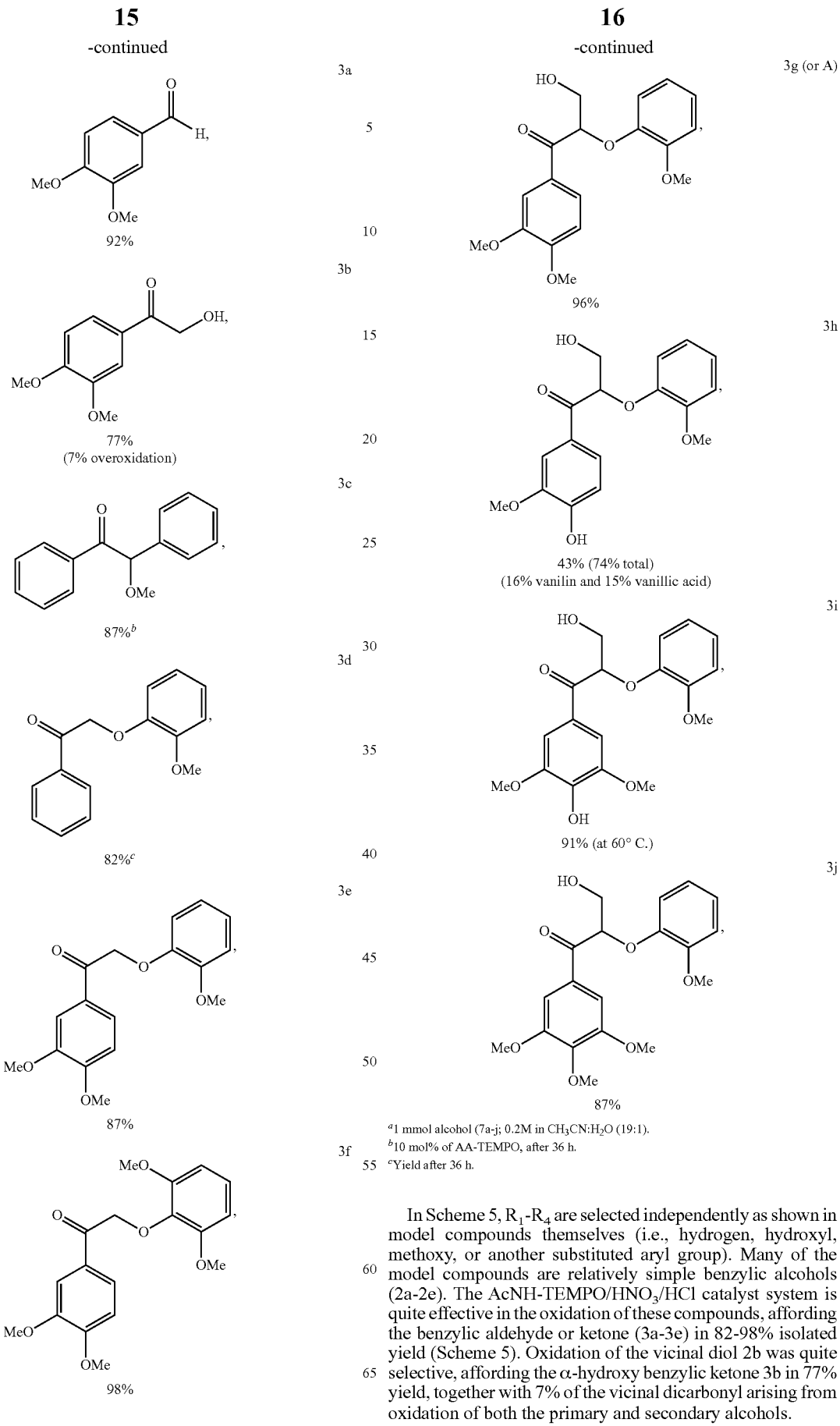

In Scheme 5, $R_1$-$R_4$ are selected independently as shown in model compounds themselves (i.e., hydrogen, hydroxyl, methoxy, or another substituted aryl group). Many of the model compounds are relatively simple benzylic alcohols (2a-2e). The AcNH-TEMPO/HNO$_3$/HCl catalyst system is quite effective in the oxidation of these compounds, affording the benzylic aldehyde or ketone (3a-3e) in 82-98% isolated yield (Scheme 5). Oxidation of the vicinal diol 2b was quite selective, affording the α-hydroxy benzylic ketone 3b in 77% yield, together with 7% of the vicinal dicarbonyl arising from oxidation of both the primary and secondary alcohols.

Despite the widespread use of compounds such 2a-f as models in lignin-conversion studies, these molecules are relatively poor chemical and structural mimics of lignin. Oxidation of the β-O-4-linked diol 1, however, remained successful under the larger scale conditions, affording a slightly better yield (96%) than obtained in the screening studies. Several additional β-O-4-linked diols were prepared and evaluated, including compounds with a trioxygenated aromatic ring (2i and 2j) similar to the syringyl (S) unit in lignin and compounds similar to the guaiacyl (G) unit in lignin (2f and 2g).

Compounds containing free phenols present unique reactivity challenges because they have been shown to decompose into complex product mixtures with other oxidation catalysts. In the present method, these types of compounds exhibited good reactivity and excellent yields of the ketone were obtained with S-type substrates 3i and 3j (87% and 91%, respectively). See Scheme 5. No C—C cleavage or overoxidation products were observed in these reactions. In contrast, oxidation of the G-type phenol 2h led to ketone 3h in 43% yield, together with a 31% yield of vanillin and vanillic acid (16% and 15% yields, respectively).

The next step in developing the process claimed herein was to develop an efficient and applicable method to cleave the aliphatic C—C bond selectively. We found exposing the pre-oxidized lignin model compound 3g (or A) to basic hydrogen peroxide (4 mL 30%) gave 71% yield of veratric acid (4). Additionally, ortho-benzoquinone and an open chain di-acid were observed as guaiacol over oxidation products (see Examples for more information). The C—C bond cleavage of cyclic 1,2-diketone with alkaline hydrogen peroxide in mixture of solvent was previously reported. Applying the modified conditions afforded complete conversion and 88% yield of veratric acid 4 at mild conditions when a mixture of solvents, THF/MeOH/H$_2$O (1:1:2), and 5 equivalents of H$_2$O$_2$ was used (Sawaki, Y.; Foote, C. S. *J. Am. Chem. Soc.* 1983, 105, 5035.) See Scheme 6. Furthermore, in this reaction 42% guaiacol 5 were also obtained.

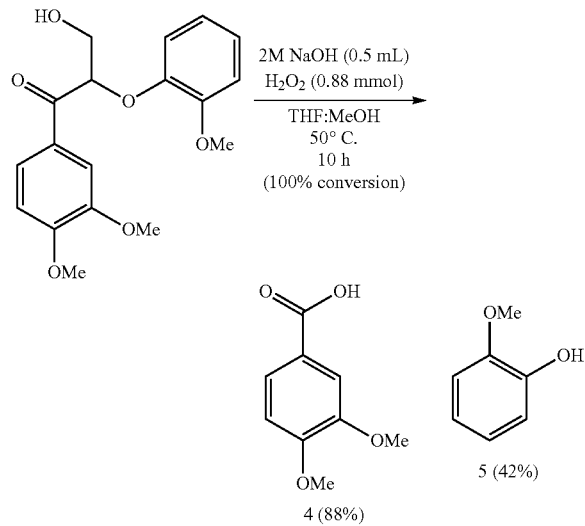

Scheme 6. Selective C-C cleavage of the pre-oxidized lignin model 3g by hydrogen peroxide.

Figure 4A:
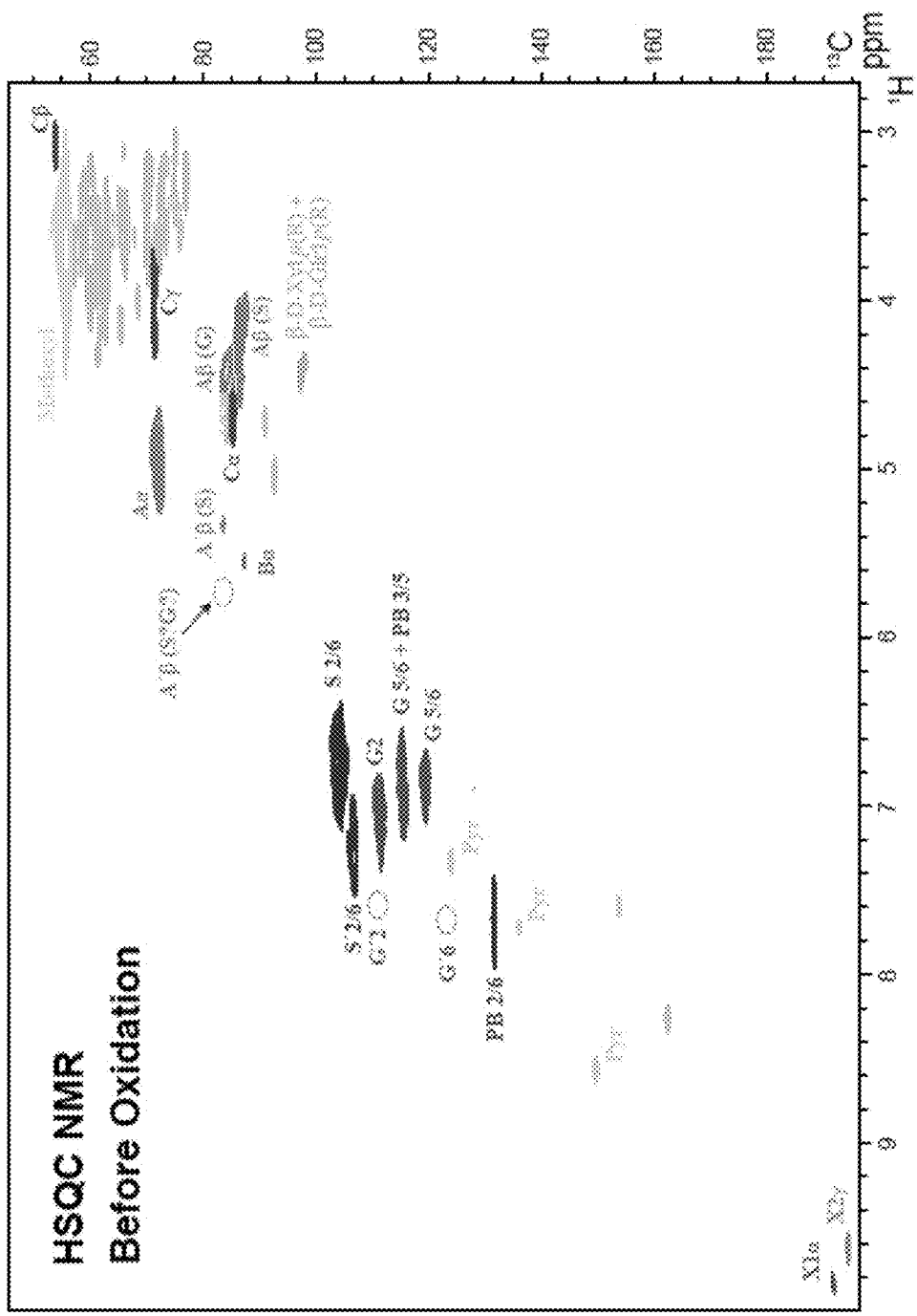
FIG. 4A is a 2-D HSQR NMR spectrum of a lignin sample before oxidation according to the present method.
Figure 4B:
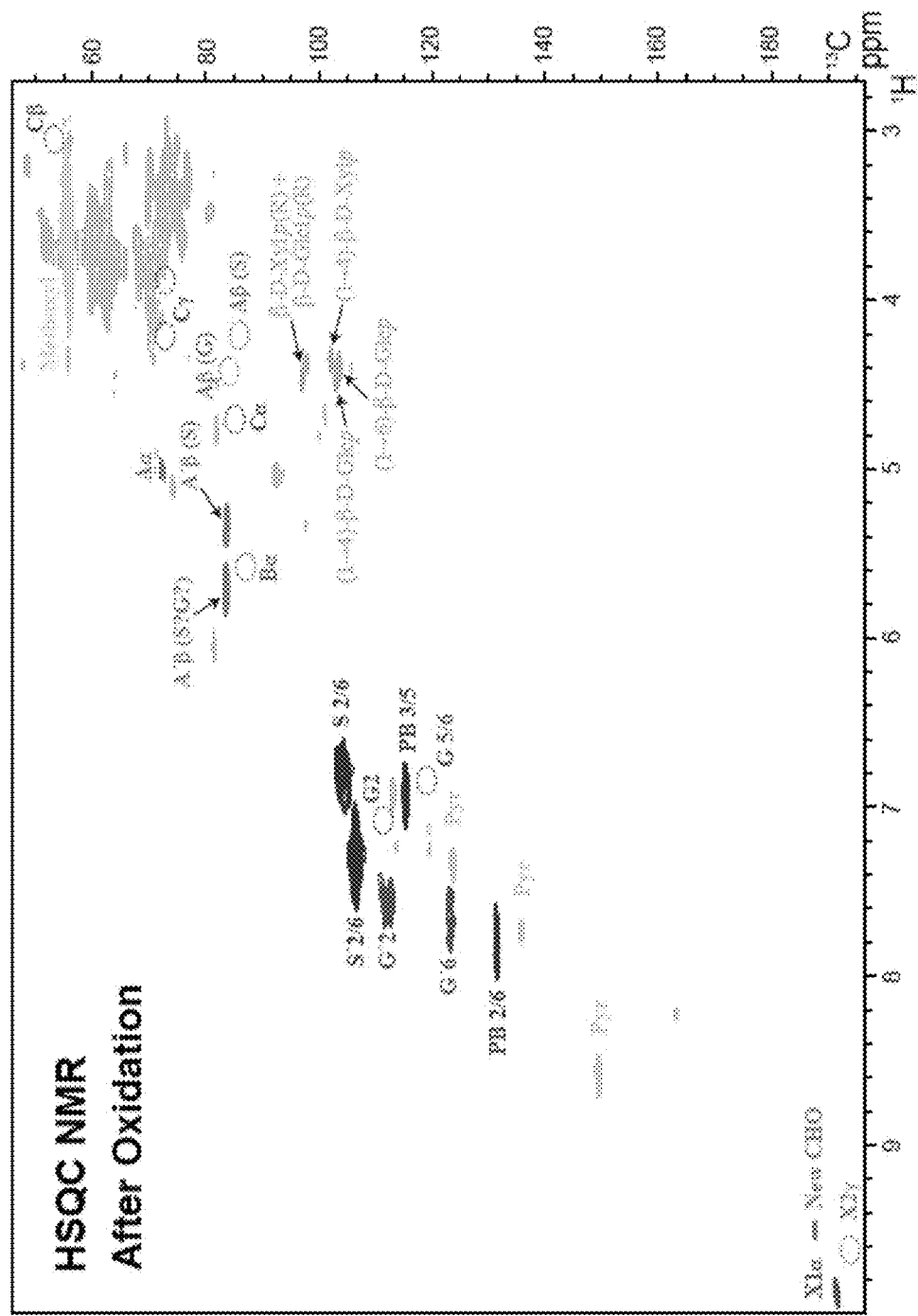
FIG. 4B is a 2-D HSQR NMR spectrum of a lignin sample after oxidation according to the present method.
Figure 4C:
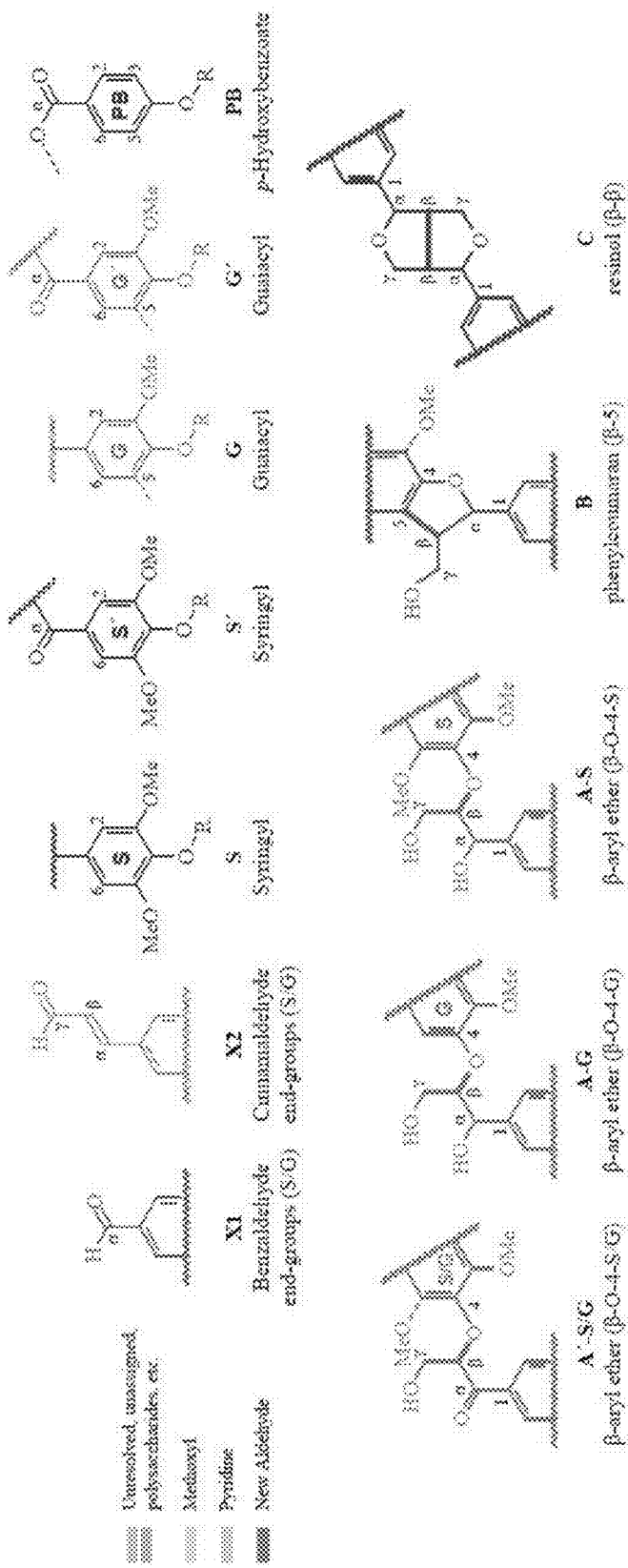
FIG. 4C is a key depicting proton assignments for the spectra shown in FIGS. 4A and 4B.

Oxidation of Authentic Aspen Lignin Sample by HNO$_3$/HCl/AA-TEMPO:

The optimized metal-free aerobic oxidation method was applied on authentic Aspen lignin sample and the resulted compound was analyzed by 2D NMR spectroscopy. The results are depicted in FIGS. 4A and 4B. FIG. 4A is the 2-D HSQR NMR spectrum of the lignin sample before oxidation. FIG. 4B is the 2-D HSQR NMR spectrum of the lignin sample after oxidation according to the present method. FIG. 4C is the key depicting proton assignments for the spectra shown in FIGS. 4A and 4B. The spectrum shows that all the secondary benzylic alcohol in guaiacyl (G) units and most part of the secondary benzylic alcohol in syringyl (S) units selectively oxidized to corresponding ketone functional groups. (Full details are provided in the Examples).

Of particular note is that the present method, in which a non-metal-containing catalyst system is used, results in the selective oxidation of benzylic secondary alcohols in both lignin model compounds and lignin itself. Also of particular note is that the system will function in both the presence and absence of the nitroxyl free-radical. This is an important economic consideration because NHAc-TEMPO, related TEMPO derivatives, and other nitroxyl radicals are relatively expensive reagents. Thus, the ability to exclude nitroxyl radicals from the catalyst system increases the economic viability of the process. Thus, the present process is the first reported metal-free aerobic method which catalyzes selective oxidation of benzylic alcohol groups in both lignin model compounds and lignin itself. See also the Examples below more information.

EXAMPLES

The Examples are provided solely to facilitate a better understanding of the process described and claimed herein. The Examples are not intended to limit the scope of the process claimed herein in any fashion.

General Considerations:

All commercially available compounds were purchased and used as received, unless otherwise noted. Solvents were dried over alumina column prior to use. Purification and drying of commercial solvents generally is not required for the catalytic reactions described in the Examples. $^1$H and $^{13}$C NMR spectra were obtained with a Varian 300 MHz, or Bruker AC-400 MHz instrument with the solvent peak or tetramethylsilane used as the internal reference. Multiplicities are described by using the following abbreviations: s=singlet, d=doublet, t=triplet, q=quartet, sept=septet, m=multiplet, b=broad. Flash chromatography was performed using SiliaFlash® P60 particle size 40-63 μm, 230-400 mesh. (SiliaFlash® is a registered trademark of Silicycle, Inc, Quebec City, Canada.) Some chromatography was carried out using a CombiFlash Rf® system with reusable high performance silica columns (RediSep® Rf Gold Silica, 2040 μm spherical particles). (CombiFlash Rf® and RediSep® are registered trademarks of Teledyne Instruments, Inc., Thousand Oaks, Calif., USA). Except veratryl alcohol and 2-methoxy-1,2-diphenylethanol (both from Sigma-Aldrich), the rest of the lignin model compounds were prepared according to literature procedures.

Synthesis of Lignin Model Compounds 3,4-(Dimethoxyphenyl)ethyleneglycol (2b) This compound was prepared according to a literature procedure. (Cho, D. W.; Parthasarathi, R.; Pimentel, A. S.; Maestas, G. D.; Park, H. J.; Yoon, U. C.; Dunaway Mariano, D.; Gnanakaran, S.; Langan, P.; Patrick S. Mariano, P. S. *J. Org. Chem.* 2010, 75, 6562.) Spectral data were consistent with those reported in the literature.

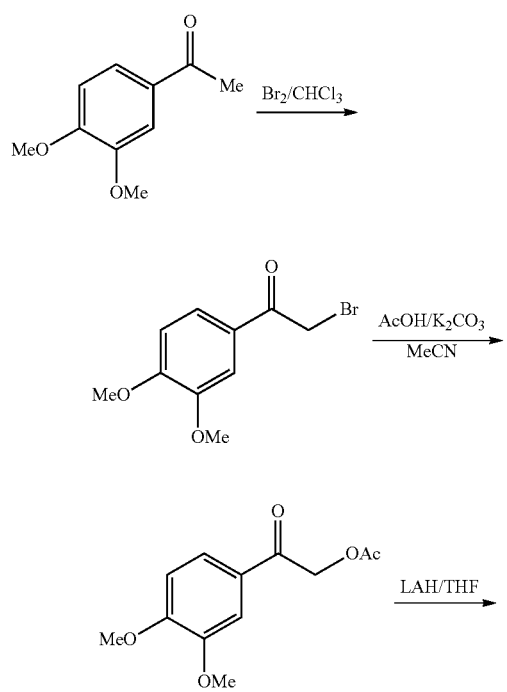

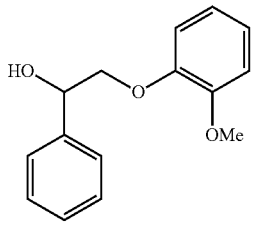

¹H-NMR: 6.91-6.82 (m, 3H), 4.76-4.73 (m, 1H), 3.87 (s, 3H), 3.86 (s, 3H), 3.73-3.62 (m, 2H), 2.56 (b s, 2H), HRMS (EI) calculated for $C_{10}H_{14}O_4$ [M+Na]⁺ 221.0790, found 221.0785.

General Procedure for Preparing 2-aryloxy-1-phenethanols (2d, 2e, and 2f):

These substrates were synthesized in two steps from the corresponding phenol and 2-bromoacetophenone according to literature procedures. ((a) Kandanarachchi, P. H.; Autrey, T.; Franz, J. A. J. Org. Chem. 2002, 23, 7937. (b) Nichols, J. M.; Bishop, L. M.; Bergman, R. G., Ellman, J. A. J. Am. Chem. Soc. 2010, 132, 12554.) 2-Bromoacetophenone (5 mmol, 0.990 g) was added to a stirred solution of $K_2CO_3$ (7.5 mmol, 1.036 g) and guaiacol (6.25 mmol, 0.776 g) in acetone (50 mL). The reaction mixture was stirred at reflux temperature for 5 h, after which it was filtered off and concentrated under vacuum. The residue was purified by column chromatography with hexane:ethyl acetate (3:1). The resulting compound (3.5 mmol, 0.847 g) was dissolved in THF:$H_2O$ (5:1) (25 mL) and sodium borohydride (7 mmol, 0.26 g) was added drop-wise to maintain a gentle evolution of gas. Then, the mixture was stirred for 6 h at room temperature. The reaction mixture was quenched with saturated aqueous $NH_4Cl$ (50 mL) and diluted with 30 mL water. The aqueous portion was extracted with ethyl acetate (3×30 mL). The organic parts were combined, dried over $MgSO_4$, filtered and concentrated under vacuum. The residue purified by column chromatography with hexane:ethyl acetate (2:1).

2-(2-Methoxyphenyl)oxy-1-phenethanol (2d)

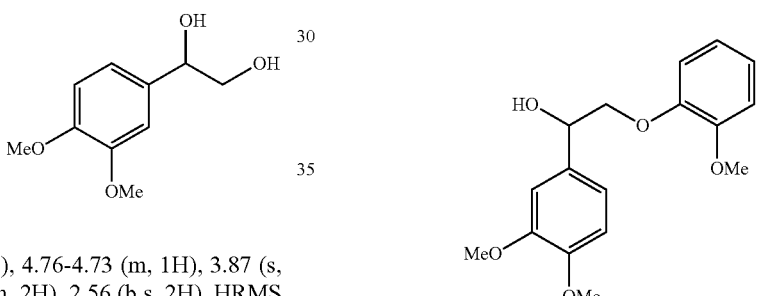

Spectral data were consistent with those reported in the literature. ¹H NMR (400 MHz, CDCl₃) δ 7.48 (d, J=7.8 Hz, 2H), 7.41 (t, J=7.8 Hz, 2H), 7.35 (t, J=7.8 Hz, 1H), 7.31-7.29 (m, 1H), 6.99-6.92 (m, 3H), 5.14 (d, J=9.7 Hz, 1H), 4.13 (dd, J=9.7, 2.8 Hz, 1 H), 4.05-4.00 (m, 1H), 2.86 (s, 1H). HRMS (EI) calculated for $C_{15}H_{16}O_3Na$ [M+Na]⁺ 267.0997, found 267.0992.

2-(2-Methoxyphenyl)oxy-1-(3,4-dimethoxyphenyl)-ethanol (2e)

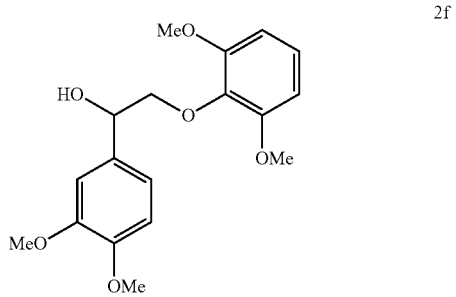 [SMILES: COc1ccc(C(O)COc2c(OC)cccc2OC)cc1OC]

Spectral data were consistent with those reported in the literature. ¹H NMR (400 MHz, CDCl₃) δ 7.03-6.99 (m, 2H), 6.98-6.90 (m, 4H), 6.86 (d, J=8.2 Hz, 1H), 5.06 (d, J=9.3 Hz, 1H), 4.16 (dd, J=9.3, 2.1 Hz, 1 H), 3.97 (m, 1H), 3.91 (s, 3H), 3.89 (s, 6H), 3.55 (b s, 1H). HRMS (EI) calculated for $C_{17}H_{20}O_5Na$ [M+Na]⁺ 327.1209, found 327.1203.

2-(2,6-Dimethoxyphenyl)oxy-1-(3,4-dimethoxyphenyl)-ethanol (2f)

The reaction gave 84% overall yield in two steps. Colorless solid, mp. 127-128° C. $^1$H NMR (400 MHz, CDCl$_3$) δ 7.03 (t, J=8.4 Hz, 1H), 7.00-6.94 (m, 1H), 6.94-6.87 (m, 1H), 6.82 (d, J=8.2 Hz, 1H), 6.61 (d, J=8.4 Hz, 2H), 4.91 (dd, J=10.5, 2.5 Hz, 1H), 4.53 (b s, 1H), 4.39 (dd, J=11.0, 2.5 Hz, 1H), 3.87 (s, 9H), 3.85 (s, 3H), 3.70 (t, J=10.5 Hz, 1H). $^{13}$C NMR (100 MHz, CDCl$_3$) δ 153.39, 149.12, 148.66, 136.93, 132.16, 124.24, 118.81, 111.09, 109.54, 105.28, 80.29, 72.36, 56.25, 56.06, 56.02. HRMS (EI) calculated for C$_{17}$H$_{20}$O$_5$Na [M+Na]$^+$ 357.1314, found 357.1309.

Erythro-1-(3,4-dimethoxyphenyl)-2-(2-methoxyphenoxy)-1,3-propanediol (2g)

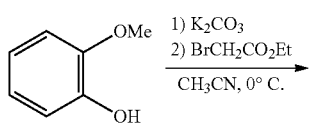

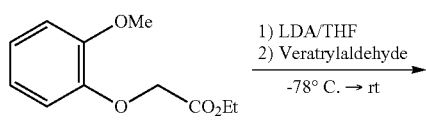

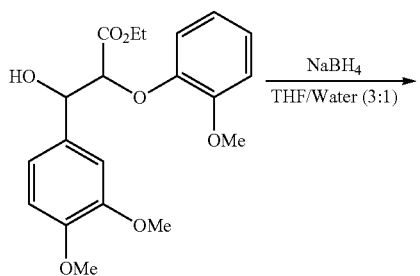

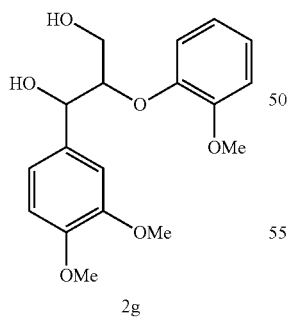

2g

This compound was prepared according to a literature procedure. (Buendia, J.; Mottweiler, J.; Bolm, C. Chem. Eur. J. 2011, 17, 13877.) Spectral data were consistent with those reported in the literature. $^1$H NMR (400 MHz, CDCl$_3$) δ 7.07 (ddd, J=8.2 Hz, 7.2, 1.6, 1.6 Hz, 1H), 7.02-6.84 (M, 5H), 6.82 (D, J=8.2 Hz, 1H), 4.98 (b t, J=4.8 Hz, 1H), 4.16 (ddd, J=6.0, 4.8, 3.5 Hz, 1 H), 3.95-3.90 (m, 1H), 3.87 (s, 3H), 3.86 (s, 6H), 3.66 (ddd, J=12.0, 7.2, 3.5 Hz, 1H), 2.87 ppm (b s, 1H). HRMS (EI) calculated for C$_{18}$H$_{22}$O$_6$Na [M+Na]$^+$ 357.1314, found 357.1311.

Erythro-1-(4-hydroxy-3-methoxyphenyl)-2-(2-methoxyphenoxy)-1,3-propanediol (2h)

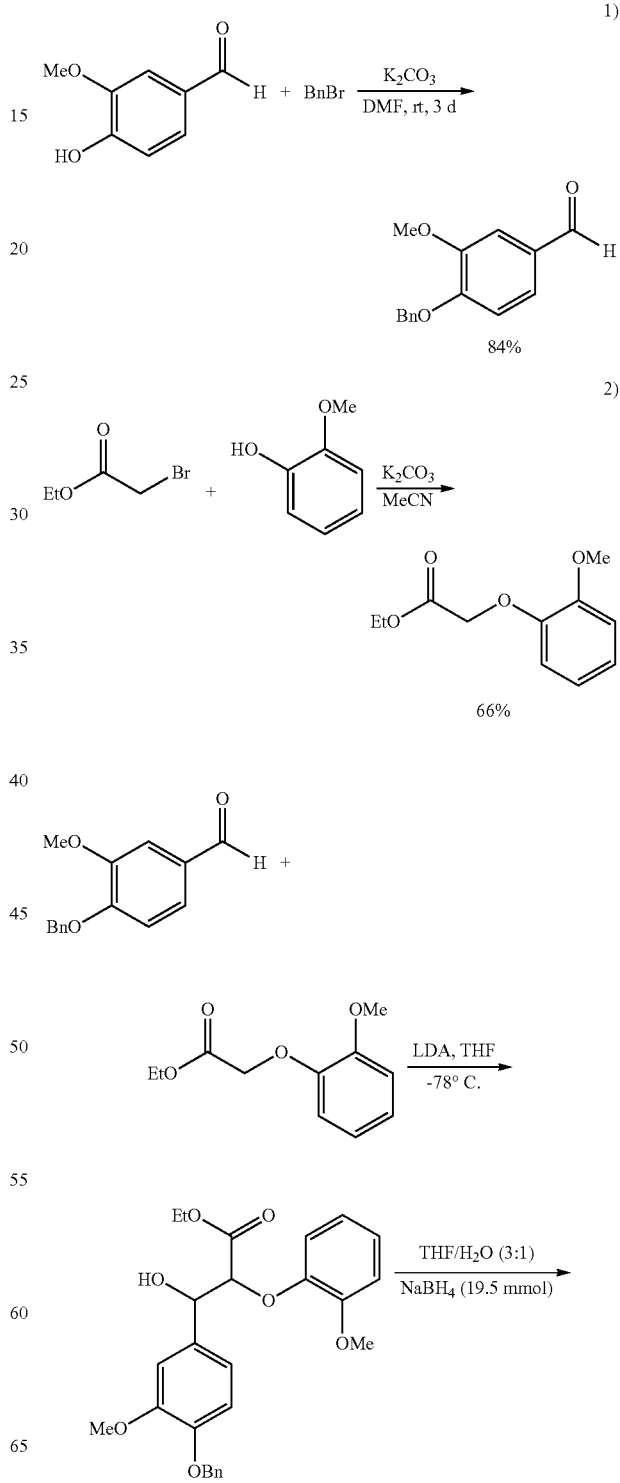

-continued

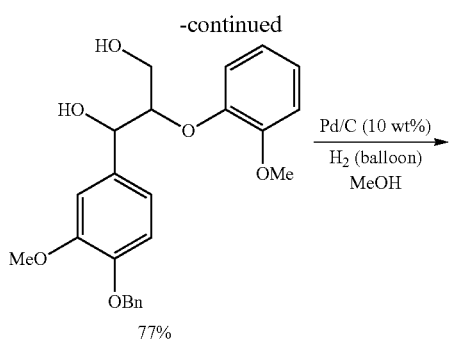

77%

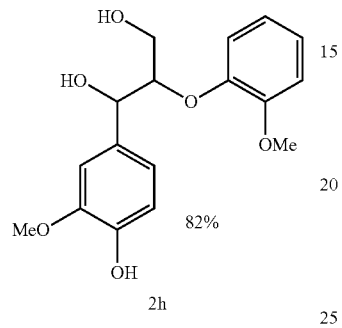

82%

This compound was prepared according to the same literature procedure as for compound 2g. Spectral data were consistent with those reported in the literature. $^1$H NMR (400 MHz, CDCl$_3$) δ 7.16 (dd, J=8.2, 1.6 Hz, 1H), 7.04-6.86 (m, 5H), 6.86 (d, J=8.2 Hz, 1H), 5.71 (b s 1H), 4.96 (d, J=7.9 Hz, 1H), 4.06-3.97 (m, 1H), 3.90 (s, 3H), 3.87 (s, 3H), 3.73-3.58 (m, 2H), 3.48 (ddd, J=12.0, 7.8 and 3.6 Hz, 1H), 2.78-2.73 (m, 1H). HRMS (ESI) calculated for C$_{17}$H$_{20}$O$_6$Na [M+Na]$^+$ 343.1158, found 343.1154.

2-(2-Methoxyphenoxy)-1-(3,4,5-trimethoxyphenyl)-1,3-propanediol (2j)

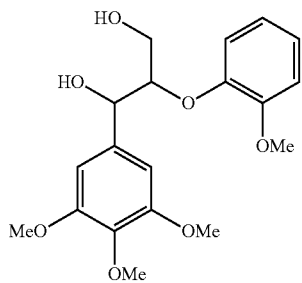

This compound was prepared in the same fashion as 2g. This method resulted in the formation of a colorless sticky semi-solid in 66% overall yield, which was a mixture of the erythro: threo isomers (1.85:1). $^1$H NMR (300 MHz, CDCl$_3$) δ 7.107.00 (m, 4H, minor diastereomer), 6.94-6.87 (m, 4H, major diastereomer), 6.66 (s, 2H, minor diastereomer), 6.60 (s, 2H, major diastereomer), 4.96-4.92 (m, 2H, both diastereomers), 4.14 (ddd, J=6.1, 4.6, 3.2 Hz, 1H, major diastereomer), 4.04 (ddd, J=6.1, 4.6, 3.2 Hz, 1H, minor diastereomer), 3.87, 3.84, 3.83, 3.81 and 3.80 (all singlets for methoxy groups, 12H for any diastereomer), 370-3.61 (m, 1H, major diastereomer), 3.57-3.46 (m, 1H, minor diastereomer), 2.96 (b s, 2H, both diastereomer). $^{13}$C NMR (75 MHz, CDCl$_3$) major diastereomer: δ 153.39, 151.61, 147.02, 137.47, 135.89, 124.27, 121.74, 120.83, 112.33, 103.31, 89.15, 87.15, 73.14, 61.00, 56.29, 56.02; minor diastereomer: δ 153.43, 151.35, 147.68, 137.86, 135.52, 124.35, 121.82, 120.97, 112.33, 104.17, 89.15, 87.13, 74.26, 61.23, 60.97, 56.04. HRMS (EI) calculated for C$_{19}$H$_{24}$O$_7$NH$_4$ [M+NH4]$^+$ 382.1866. found 382.1861.

2-(2-Methoxyphenoxy)-1-(4-hydroxy-3,5-dimethoxyphenyl)-1,3-propanediol (2i)

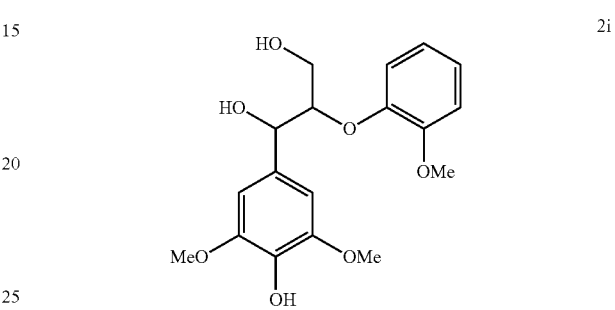

This compound was prepared in same fashion as 2h and a literature procedure. (Pardini, V. L., Smith, C. Z., Utley, J. H. P., Vargas, R. R., Viertler, H. J. Org. Chem. 1991, 56, 7305.) $^1$H NMR (300 MHz, CDCl$_3$) δ 7.146.90 (m, 4H), 6.68 (s, 2H, minor diastereomer), 6.62 (s, 2H, major diastereomer), 5.55 (s, 1H, minor diastereomer, —OH), 5.52 (s, 1H, major diastereomer, —OH), 4.95 (m, 1H), 4.14 (m, 1H, major diastereomer), 4.00 (m, 1H, minor diastereomer), 3.91 (s, 3H, minor diastereomer), 3.89 (s, 3H, major diastereomer), 3.88 (s, 6H, minor diastereomer), 3.86 (s, 6H, major diastereomer), 3.70-3.62 (m, 1H, major diastereomer), 3.55-3.53 (m, 1H, minor diastereomer), 2.74 (b s, 1H). $^{13}$C NMR (75 MHz, CDCl$_3$) major diastereomer: δ 151.85, 147.32, 134.37, 131.19, 124.50, 121.89, 121.41, 112.41, 103.91, 102.9, 87.66, 73.14, 61.01, 56.58, 56.12; minor diastereomer: δ 151.6, 147.10, 134.71, 130.86, 124.56, 121.95, 121.31, 112.41, 103.90, 102.91, 89.74, 74.47, 61.16, 56.58, 56.14. HRMS (EI) calculated for C$_{18}$H$_{22}$O$_7$NH$_4$ [M+NH4]$^+$ 368.1709, found 368.1704.

Figure 5:
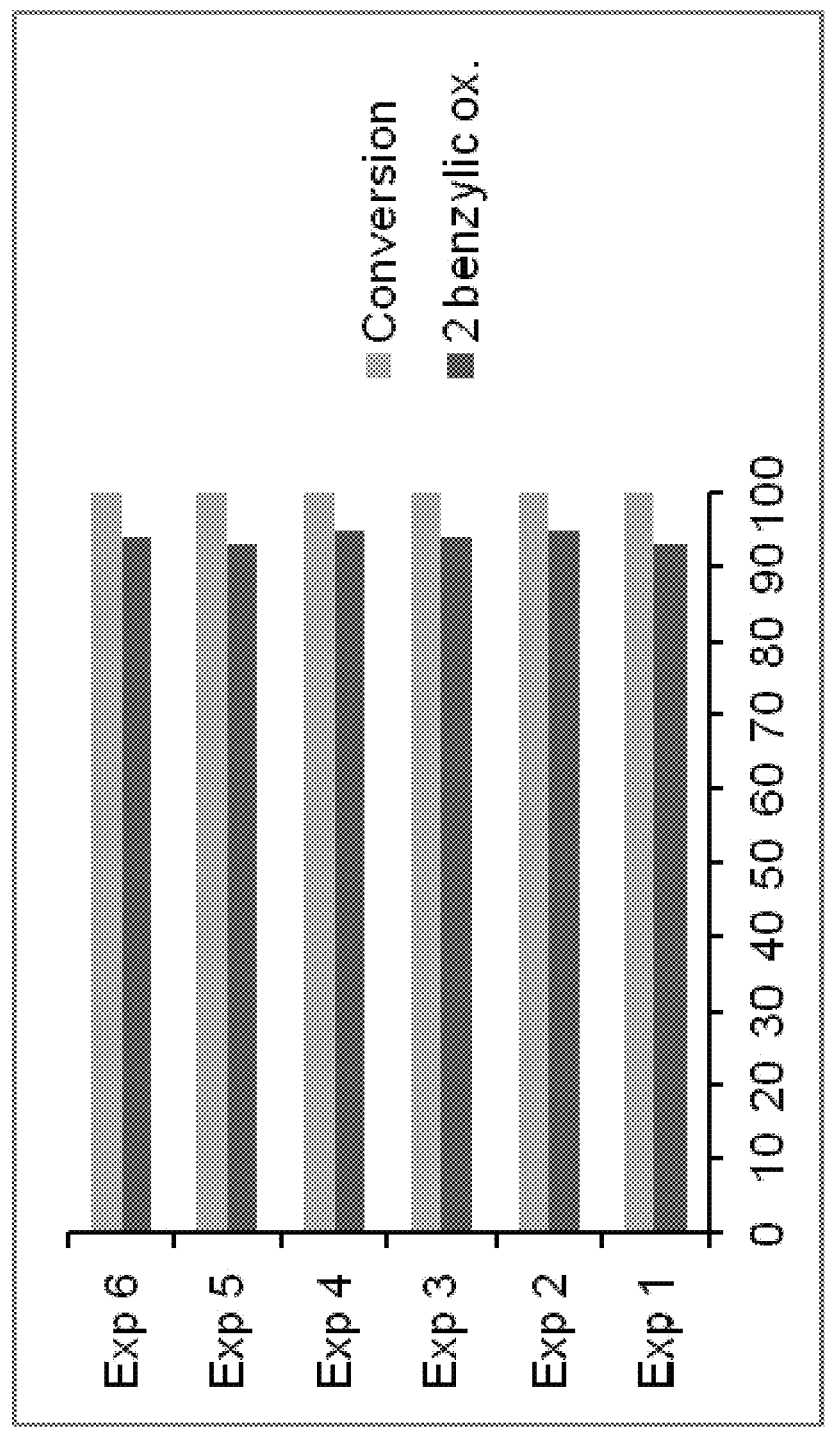
FIG. 5 is a histogram depicting yield and conversion of aerobic oxidation of compound 1 using HNO3/HCL/AA-TEMPO. Six (6) duplicate runs are shown, illustrating that the results are reproducible.

General Procedure for Oxidation of Lignin Model Compounds:

To a 25 mL high pressure tube with a stir bar was added lignin model compound (1 mmol) and 5 mol % of NHAc-TEMPO (0.05 mmol, 10.6 mg). The tube was sealed, evacuated and filled to 1.1 atm with oxygen gas. Nitric acid (67%; 9.4 μL) (0.1 mmol, 6.3 mg) in 1 mL acetonitrile and 9.9 μL of hydrochloric acid (37%) (0.1 mmol, 3.65 mg) in 1 mL of acetonitrile was injected through the septum individually. Additional 3 mL of acetonitrile and 260 μL of water were injected. The reaction mixture was stirred for 24 h at 45° C. The solvent was evaporated and the residue was subjected to column chromatography to ascertain the amount of the corresponding carbonyl compound. The reaction of 1 with optimized catalyst system was repeated several times. The results are shown in FIG. 5. As is clearly depicted in the figure, the conversion and yield results for this catalytic system (HNO$_3$/

HCl/NHAc-TEMPO) are highly consistent. The six identical runs yielded statistically identical conversions and yields.

3,4-Dimethoxy-benzaldehyde (3a)

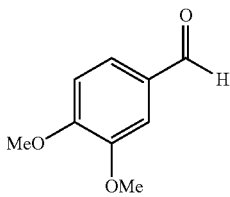

Spectral data were consistent with those reported in the literature. (Jeena, V.; Robinson, R. S. Chem. Commun. 2012, 48, 299.) $^1$H NMR (400 MHz, CDCl$_3$) δ 9.86 (s, 1H), 7.47 (dd, J=8.2, 2.0 Hz, 1H), 7.41 (d, J=1.8 Hz, 1H), 6.97 (d, J=8.2 Hz, 1H), 3.97 (s, 3H), 3.95 (s, 3H). HRMS (EI) calculated for C$_9$H$_{10}$O$_3$ [M]$^+$ 166.0630, found 166.0626.

1-(3,4-Dimethoxyphenyl)-2-hydroxyacetone (3b)

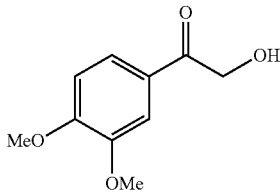

Spectral data were consistent with those reported in the literature. (same as ref for 2b) $^1$H NMR (400 MHz, CDCl$_3$) δ 7.50 (s, 1H), 7.49 (d, J=8.1 Hz, 1H), 6.91 (d, J=8.1 Hz, 1H), 4.84 (s, OH 2H), 3.95 (s, 3H), 3.94 (s, 3H), 3.55 (b s, 1H). HRMS (EI) calculated for C$_{10}$H$_{12}$O$_4$Na [M+Na]$^+$ 219.0633, found 219.0629.

2-Methoxy-1,2-diphenyl-ethanone (3c)

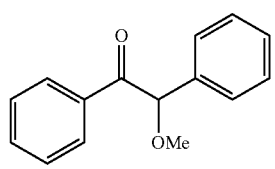

Spectral data were consistent with those reported in the literature. (Cutulic, S. P. Y.; Findlay, N.J.; Zhou, S Z.; Chrystal, E. J. T.; Murphy, J. A. J. Org. Chem. 2009, 74, 8713.) $^1$H NMR (400 MHz, CDCl$_3$) δ 8.00-7.98 (m, 2H), 7.52-7.45 (m, 3H), 7.41-2.27 (m, 3H), 5.52 (s, 1H), 3.46 (s, 3H). HRMS (EI) calculated for C$_{15}$H$_{15}$O$_2$ [M+H]$^+$ 227.1072. found 227.1075.

2-(2-Methoxyphenoxy)-1-phenyl-ethanone (3d)

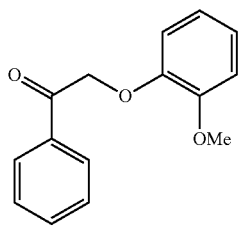

Spectral data were consistent with those reported in the literature. (same as ref 'b' in general procedure for preparation of 2d-f) $^1$H NMR (400 MHz, CDCl$_3$) δ 8.00 (d, J=8.0 Hz, 2H), 7.61 (d, J=7.6 Hz, 1H), 7.49 (t, J=7.6 Hz, 2H), 6.99-6.85 (m, 4H), 5.35 (s, 2H), 3.88 (s, 3H). HRMS (EI) calculated for C$_{15}$H$_{15}$O$_3$ [M+H]$^+$ 243.1021, found 243.1016.

2-(2-Methoxyphenoxy)-1-(3,4-dimethoxyphenyl)-ethanone (3e)

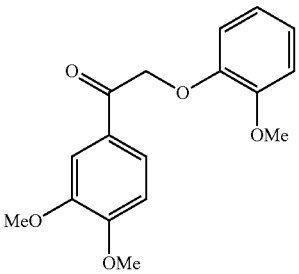

Spectral data were consistent with those reported in the literature. (same as ref 'b' in general procedure for preparation of 2d-f) $^1$H NMR (400 MHz, CDCl$_3$) δ 7.67 (dd, J=7.8, 1.8 Hz, 1H), 7.60 (d, J=7.8 Hz, 1H), 6.96-6.83 (m, 5H), 5.29 (s, 2H), 3.95 (s, 3H), 3.93 (s, 3H), 3.88 (s, 3H). HRMS (EI) calculated for C$_{17}$H$_{19}$O$_5$ [M+H]$^+$ 303.1232, found 303.1227.

2-(2,6-Dimethoxyphenoxy)-1-(3,4-dimethoxyphenyl)-ethanone (3f)

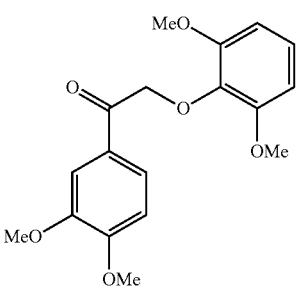

Spectral data were consistent with those reported in the literature. (Hurrell, L.; Johnston, L. J.; Mathivanan, N.; Vong, D. Can. J. Chem. 1993, 71, 1340.) $^1$H NMR (300 MHz, CDCl$_3$) δ 7.70 (dd, J=8.4, 2.0 Hz, 1H), 7.62 (d, J=2.0 Hz, 1H), 6.98 (t, J=8.4 Hz, 1H), 6.87 (d, J=8.4 Hz, 1H), 6.56 (d, J=8.4 Hz, 2H), 5.12 (s, 2H), 3.91 (s, 6H), 3.78 (s, 6H). HRMS (EI) calculated for C$_{18}$H$_{21}$O$_6$ [M+H]$^+$ 333.1338, found 333.1333.

1-(3,4-Dimethoxyphenyl)-3-hydroxy-2-(2-methoxyphenoxy)-1-propanone (3 g)

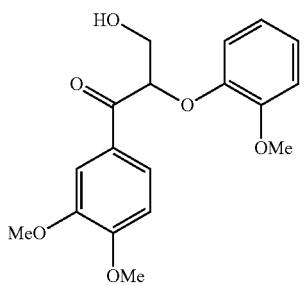

Spectral data were consistent with those reported in the literature. (See reference cited for compound 2b.) $^1$H NMR (400 MHz, CDCl$_3$) δ 7.74 (dd, J=8.2, 2.0 Hz, 1H), 7.62 (d, J=2.0 Hz, 1H), 7.01-6.83 (m, 5H), 5.39 (t, J=5.6 Hz, 1H), 4.07 (t, J=5.6, 2H), 3.95 (s, 3H), 3.92 (s, 3H), 3.86 (s, 3H), 2.97 (b s, 1H). HRMS (EI) calculated for C$_{18}$H$_{20}$O$_6$Na [M+Na]$^+$ 355.1158, found 355.1153.

1-(4-Hydroxy-3-methoxyphenyl)-3-hydroxy-2-(2-methoxyphenoxy)-1-propanone (3h)

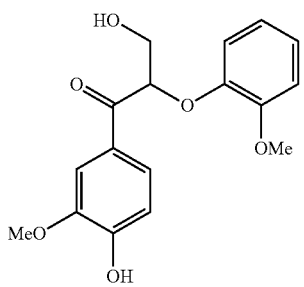

Spectral data were consistent with those reported in the literature. (Badamali, S. K.; Luque, R.; Clark, J. H.; Breeden, S. W. Catalysis Communications 2011, 12, 993.) $^1$H NMR (400 MHz, CDCl$_3$) δ 7.69 (dd, J=8.2, 1.9 Hz, 1H), 7.61 (d, J=1.9 Hz, 1H), 7.01-6.79 (m, 5H), 6.38 (b s, 1H), 5.41 (t, J=5.2 Hz, 1H), 4.08 (d, J=4.1 Hz, 2H), 3.90 (s, 3H), 3.84 (3H), 3.18 (b s, 1H). $^{13}$C NMR (100 MHz, CDCl$_3$) δ 195.1, 151.4, 150.6, 147.1, 147.1, 127.9, 124.4, 123.7, 121.4, 118.4, 114.3, 112.5, 111.0, 84.5, 63.9, 56.3, 56.0. HRMS (ESI) calculated for C$_{17}$H$_{18}$O$_6$Na [M+Na]$^+$ 341.1001, found 341.1005.

1-(3,4,5-Trimethoxyphenyl)-3-hydroxy-2-(2-methoxyphenoxy)-1-propanone (3j)

$^1$H NMR (400 MHz, CDCl$_3$) δ 7.36 (s, 2H), 7.01 (dd, J=7.6, 2.0 Hz, 1H), 6.93-6.89 (m, 2H), 6.84 (dd, J=7.8, 2.0 Hz, 1H), 5.36 (t, J=5.3 Hz, 1H), 4.09 (d, J=5.3 Hz, 2H), 3.92 (s, 3H), 3.88 (s, 6H), 3.85 (s, 3H), 3.17 (b s, 1H). $^{13}$C NMR (100 MHz, CDCl$_3$) δ 195.8, 153.3, 150.6, 147.0, 143.4, 130.2, 123.9, 121.4, 118.3, 112.5, 106.7, 84.7, 63.7, 61.2, 56.5, 56.0. HRMS (ESI) calculated for C$_{19}$H$_{22}$O$_7$Na [M+Na]$^+$ 385.1263, found 385.1267.

1-(4-Hydroxy-3,5-dimethoxyphenyl)-3-hydroxy-2-(2-methoxyphenoxy)-1-propanone (3i)

Spectral data were consistent with those reported in the literature. (Vanholme, R.; Demedts, B.; Morreel, K.; Ralph, J.; Boerjan, W. *Plant Physiology*, 2010, 153, 895.) $^1$H NMR (400 MHz, CDCl$_3$) δ 7.42 (s, 2H), 7.02-6.86 (m, 4H), 6.02 (s, 1H), 5.39 (t, J=4.6 Hz, 1H), 4.11 (d, J=4.6 Hz, 2H), 3.85 (s, 6H), 3.83 (s, 3H), 3.08 (b s, 1H). $^{13}$C NMR (100 MHz, CDCl$_3$) δ 195.4, 150.8, 147.2, 140.8, 126.7, 124.0, 121.6, 118.4, 112.6, 106.8, 105.3, 84.9, 63.9, 56.8, 56.1. HRMS (ESI) calculated for C$_{18}$H$_{20}$O$_7$Na [M+Na]$^+$ 371.1107, found 371.1103.

Oxidation of Authentic Aspen Lignin Sample by HNO$_3$/HCl/AA-TEMPO: To a 10 mL high-pressure tube with a stir bar was added 20 mg of aspen tree lignin and 1 mg of AA-TEMPO. The tube was sealed, evacuated and filled to 3 atm with oxygen gas. Nitric acid (1.5 μL, 67%) in 1 mL acetonitrile and 1 μL of hydrochloric acid (37%) in 1 mL of acetonitrile were injected through the septum individually. In addition, 100 μL of water was injected. The reaction mixture was stirred for 24 h at 65° C. The mixture was cooled and slowly depressurized. The solvent was evaporated and the residue was washed with chloroform and hexane to remove all small organic compounds. A light brown solid, 13.5 mg in weight, was dissolved in DMSO (d$_6$)/pyridine (d$_5$) (4:1) for 2-D NMR studies. Comparing the NMR spectra before oxidation (FIG. 4A) and after oxidation (FIG. 4B) shows that secondary benzylic alcohols were oxidized to corresponding carbonyl groups selectively. In short, see FIG. 4A, which is the NMR spectrum before oxidation as compared to FIG. 4B, which is the NMR spectrum after oxidation. FIG. 4C is the color-coded assignment of peaks by substituent type for FIGS. 4A and 4B.

General Procedure for C—C Cleavage of Oxidized Lignin Model Compound by Hydrogen Peroxide in Aqueous Alkaline Media: 4 mL of hydrogen peroxide 30% adjusted pH at 10.0 by NaOH was added to 3 (0.5 mmol, 165.0 mg). This suspension was heated at 70° C. for 4 h. After that, the reaction mixture cooled down and the reaction mixture was acidified by aqueous HCl (0.5 M) solution (pH 3.0). Organic compounds were extracted by ethyl acetate (3×30 mL). Organic layers combined, dried over MgSO$_4$, filtered and concentrated under vacuum. The residue was submitted to NMR spectroscopy and yield of any individual compound determined by internal standard (mesitylene).

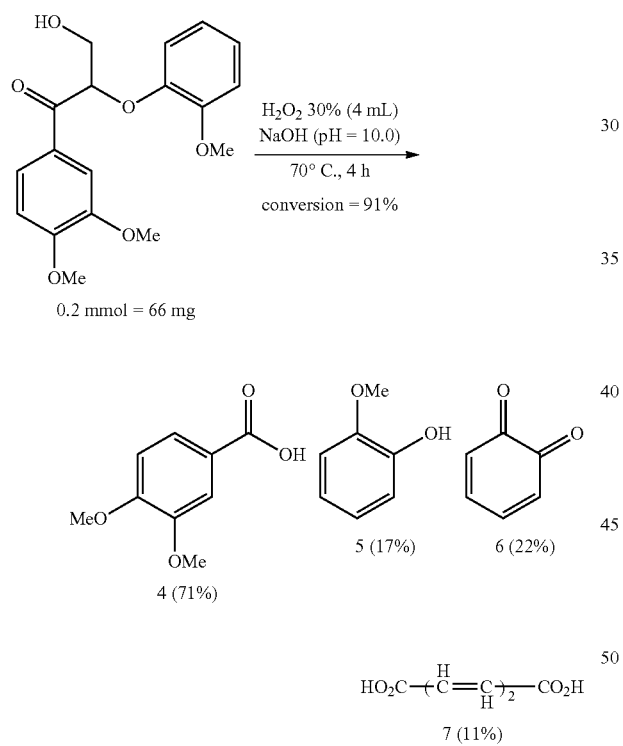

Conducting the reaction in the mixture of MeOH/THF/H$_2$O resulted in the formation of corresponding small aromatic molecules in higher yield. To a mixture of ketone 3 (0.2 mmol, 66 mg), 2M NaOH (1 mmol, 0.5 mL), MeOH and THF (0.6 mL of each) was added slowly 0.1 mL of 30% H$_2$O$_2$ (0.88 mmol), and the mixture was stirred for 10 h at 50° C. After that, the reaction mixture was acidified by 0.5 M HCl to pH=3.0. The mixture was extracted by ethyl acetate (3×30). Organic layer combined, dried over MgSO$_4$ and concentrated under vacuum. The residue was submitted to NMR spectroscopy and yield of any individual compound determined by internal standard (mesitylene).

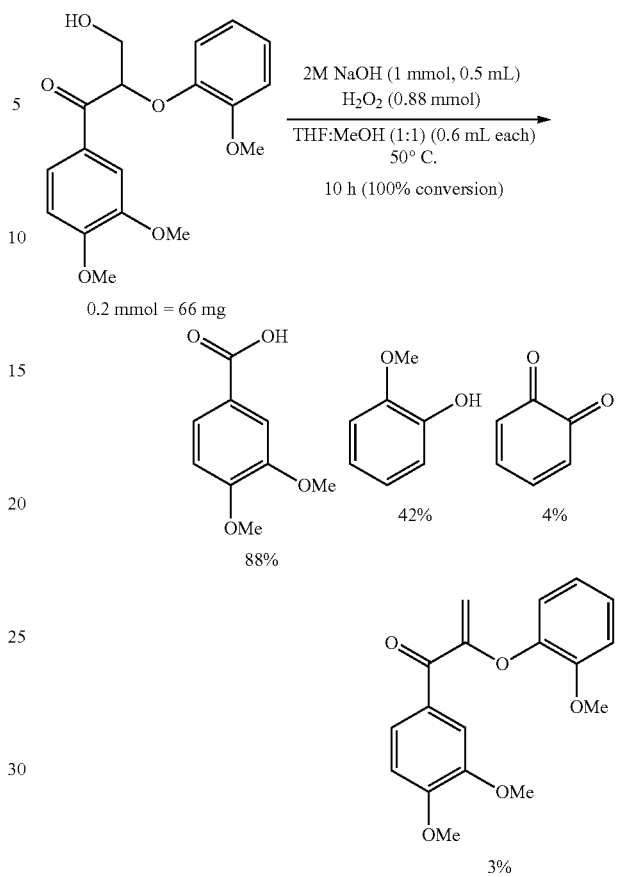

What is claimed is:

1. A method to oxidize lignin or lignin sub-units, the method comprising selectively oxidizing at least a portion of secondary benzylic alcohol groups in the lignin or lignin sub-unit to corresponding ketones while leaving unchanged at least a portion of unprotected primary aliphatic alcohols in the lignin or lignin sub-unit by contacting the lignin or lignin sub-unit with a catalyst comprising nitric acid (HNO$_3$) in combination with another Brønsted acid, in the absence of a metal-containing catalyst, thereby yielding a selectively oxidized lignin or lignin sub-unit, wherein the lignin or lignin sub-unit is a non-lignosulfonate lignin or lignin sub-unit.

2. The method of claim 1, comprising contacting the lignin or lignin sub-unit with a catalyst in a polar aprotic solvent.

3. The method of claim 2, wherein the solvent further comprises up to 20 wt % water.

4. The method of claim 2, wherein the solvent comprises a nitrile.

5. The method of claim 2, wherein the solvent comprises acetonitrile.

6. The method of claim 5, wherein the solvent further comprises up to about 10 wt % water.

7. The method of claim 1, wherein the catalyst comprises HNO$_3$ in combination with a Brønsted acid selected from the group consisting of hydrochloric acid (HCl), hydrobromic acid (HBr), hydrofluoric acid (HF), hydroiodic acid (HI), phosphoric acid (H$_3$PO$_4$), sulfuric acid (H$_2$SO$_4$), boric acid (B(OH)$_3$), tetrafluoroboric acid (HBF$_4$), perchloric acid (HClO$_4$), acetic acid (CH$_3$C(O)—OH), trifluoroacetic acid (CF$_3$C(O)—OH), methanesulfonic acid (CH$_3$SO$_3$H), solid acid resins containing sulfonic acid sites, and solid acid resins containing benzoic acid sites.

8. The method of claim 7, wherein the catalyst comprises HNO₃ and HCl.

9. The method of claim 7 or claim 8, wherein the HNO₃ and the Brønsted acid are each present in a concentration of from about 2 mol % to the lignin or lignin sub-unit to about 20 mol % of the lignin or lignin sub-unit.

10. The method of any one of claim 1, 2, 3, or 7, wherein the selective oxidation is conducted in contact with atmospheric air.

11. The method of any one of claim 1, 2, 3, or 7, wherein the selective oxidation is conducted in an environment comprising an O₂ partial pressure of at least about 1 atm.

12. The method of any one of claim 1, 2, 3, or 7, wherein the selective oxidation is conducted at a temperature of from about 10° C. to about 100° C.

13. The method of any one of claim 1, 2, 3, or 7, wherein the selective oxidation is conducted in the absence of a nitroxyl radical.

14. The method of any one of claim 1, 2, 3, or 7, wherein the selective oxidation is conducted in the presence of a reagent comprising a nitroxyl radical.

15. The method of claim 14, wherein the nitroxyl radical is selected from the group consisting of T2,2,6,6-tetramethylpiperidin-1-yl)oxyl (TEMPO), 4-acetamido-(2,2,6,6-tetramethylpiperidin-1-yl)oxyl (NHAc-TEMPO), 4-C₁₋₆-alkyloxy-TEMPO, 4-hydroxy-TEMPO, diphenylnitroxyl, di-tert-butylnitroxyl, 9-azabicyclo[3.3.1]nonane N-oxyl (ABNO), and 2-azaadamantane-N-oxyl (AZADO).

16. The method of claim 14, wherein the reagent is present in a concentration of from about 2 mol % to about 10 mol % of the lignin or lignin sub-unit.

17. The method of claim 1, comprising contacting the lignin or lignin sub-unit with a catalyst comprising HNO₃ and HCl, in a solvent system comprising acetonitrile and water, and the reaction is conducted in the presence of a reagent selected from the group consisting of 2,2,6,6-tetramethylpiperidin-1-yl)oxyl (TEMPO), 4-acetamido-(2,2,6,6-tetramethylpiperidin-1-yl)oxyl (NHAc-TEMPO), 4-C₁₋₆-alkyloxy-TEMPO, 4-hydroxy-TEMPO, diphenylnitroxyl, di-tert-butylnitroxyl, 9-azabicyclo[3.3.1]nonane N-oxyl (ABNO), and 2-azaadamantane-N-oxyl (AZADO).

18. The method of claim 17, wherein the HNO₃ and HCl are each present in a concentration of from about 5 mol % of the lignin or lignin sub-unit to about 15 mol % of the lignin or lignin sub-unit.

19. The method of claim 17, wherein the selective oxidation is conducted in contact with atmospheric air.

20. The method of claim 17, wherein the selective oxidation is conducted in an environment comprising an O₂ partial pressure of at least about 1 atm.

21. The method of claim 17, wherein the selective oxidation is conducted at a temperature of from about 10° C. to about 100° C.

* * * * *